(12) United States Patent
Kobayashi

(10) Patent No.: US 7,804,568 B2
(45) Date of Patent: *Sep. 28, 2010

(54) HOMEOTROPIC ALIGNMENT TYPE LIQUID CRYSTAL DISPLAY DEVICE

(75) Inventor: Kunpei Kobayashi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 12/238,276

(22) Filed: Sep. 25, 2008

(65) Prior Publication Data

US 2009/0027602 A1    Jan. 29, 2009

Related U.S. Application Data

(62) Division of application No. 11/389,904, filed on Mar. 27, 2006, now Pat. No. 7,440,056.

(30) Foreign Application Priority Data

Mar. 30, 2005  (JP) .............................. 2005-100063
Jun. 16, 2005  (JP) .............................. 2005-176971

(51) Int. Cl.
G02F 1/1337  (2006.01)
G02F 1/1333  (2006.01)
G02F 1/1335  (2006.01)
G02F 1/1347  (2006.01)

(52) U.S. Cl. ...................... 349/130; 349/113; 349/118; 349/120; 349/141

(58) Field of Classification Search ........................ None
See application file for complete search history.

(56) References Cited

U.S. PATENT DOCUMENTS

| 5,680,184 | A | 10/1997 | Nishino |
| 6,580,848 | B2 * | 6/2003 | Hartl ............................ 385/16 |
| 6,831,721 | B2 * | 12/2004 | Maeda et al. ................ 349/117 |
| 7,019,804 | B2 | 3/2006 | Kumagai et al. |
| 7,582,227 | B2 * | 9/2009 | Verall et al. ............ 252/299.01 |
| 2002/0054260 | A1 | 5/2002 | Maeda et al. |
| 2002/0063826 | A1 | 5/2002 | Okamoto et al. |
| 2002/0140888 | A1 | 10/2002 | Nishiyama et al. |
| 2005/0259200 | A1 | 11/2005 | Skjonnemand et al. |
| 2006/0193999 | A1 | 8/2006 | Verall et al. |

FOREIGN PATENT DOCUMENTS

| CN | 1530720 A | 9/2004 |
| JP | 2003-15134 A | 1/2003 |
| KR | 2003-011572 A | 2/2003 |

* cited by examiner

*Primary Examiner*—Tina M Wong
(74) *Attorney, Agent, or Firm*—Frishauf, Holtz, Goodman & Chick, P.C.

(57) ABSTRACT

A liquid crystal display device includes a first substrate having one surface on which a first electrode is provided, a second substrate which is provided with a second electrode, and a liquid crystal layer which is interposed between the first and second substrates. Negative dielectric anisotropy homeotropic aligning films are formed on mutually faced surfaces of the first and second electrodes, respectively. A pair of polarizing plates are arranged on a side of the other surface opposite to the one surface of each substrate. And a pair of optical compensation layers are arranged respectively between the other surfaces of the substrates and the polarizing plates, and give a retardation having a value which is substantially ¼ of a wavelength λ of transmitted visible light to the transmitted visible light.

21 Claims, 13 Drawing Sheets

HOMEOTROPIC ALIGNMENT TYPE LIQUID CRYSTAL DISPLAY DEVICE

CROSS-REFERENCE TO RELATED APPLICATIONS

The present application is a Divisional Application of U.S. application Ser. No. 11/389,904 filed Mar. 27, 2006 now U.S. Pat. No. 7,440,056, which is based upon and claims the benefit of priority from prior Japanese Patent Applications No. 2005-100063, filed Mar. 30, 2005; and No. 2005-176971, filed Jun. 16, 2005, the entire contents of both of which are incorporated herein by reference.

BACKGROUND OF THE INVENTION

1. Field of the Invention

The present invention relates to a homeotropic alignment type liquid crystal display device having a liquid crystal layer in which liquid crystal molecules are vertically aligned with respect to a pair of substrates between the substrates.

2. Description of the Related Art

In a conventional liquid crystal display, a transparent type liquid crystal display device in which a backlight is set on a rear surface of the liquid crystal display device to perform illumination, a semi-transparent type liquid crystal display device in which a reflection region is partially provided or the like is extensively used as a liquid crystal display device. As alignment methods of liquid crystal molecules in these liquid crystal display devices, there are a twisted nematic (TN) mode, a homogeneous alignment mode and others. In these modes, liquid crystal molecules are arranged in substantially parallel to main surfaces or planes of the substrates in a state where a voltage is not applied, and a voltage is applied to change a long axis direction of the molecules to a direction vertical to the main surfaces of the substrates, thereby optically changing a liquid crystal layer.

In a homogeneous alignment type liquid crystal display device adopting, e.g., the above-described TN mode, liquid crystal molecules do not completely become vertical to main surfaces of substrates when a voltage is applied because of an anchoring effect or the like of a homogeneous aligning film. Therefore, birefringence in a normal direction of the substrate main surfaces does not become zero when a voltage is applied, thereby deteriorating a display grade (contrast). Thus, as an alignment method for realizing a high transmission factor and high contrast, attention is drawn to a homeotropic alignment (VA) mode by which molecules are aligned in a vertical direction (birefringence is substantially zero) with respect to the substrate main planes when no voltage is applied, and the molecules are aligned in a horizontal direction when a voltage is applied.

In the VA mode, when an electric field is applied to a liquid crystal layer, when alignment is controlled in such a manner that liquid crystal molecules are inclined in one direction in each pixel region at the time of applying an electric field to a liquid crystal layer, high contrast can be realized as described above, but viewing angle characteristics are not satisfactory. Thus, in order to improve the viewing angle characteristics, there has been proposed the following alignment control. That is, a slit or the like is provided in an electrode in the pixel region to obliquely apply an electric field. As a result, when the voltage is applied between the electrodes facing each other, alignment is controlled in such a manner that liquid crystal molecules come down in a plurality of directions in each pixel region. In the liquid crystal display device adopting this homeotropic alignment mode, however, since the falling directions of the liquid crystal molecules face many directions due to application of the voltage, light cannot be taken out when a polarization axis of a polarizing plate and an axis of the liquid crystal face the same direction as seen from a direction vertical to the substrate main surfaces, and hence a transmission factor is low.

In the liquid crystal display device adopting such a VA mode, as a device in which a plurality of retardation plates are arranged to improve contrast and viewing angle dependence (color shift) of a hue, there has been proposed a liquid crystal display apparatus in which a retardation layer having a retardation which is not smaller than approximately ½ and not greater than ¾ with respect to visible light and a retardation layer which optically has a negative refractive index anisotropy and a retardation which is approximately zero with respect to visible light are arranged in a homeotropic alignment type liquid crystal cell (e.g., Jpn. Pat. Appln. KOKAI Publication No. 2003-015134).

According to the liquid crystal display apparatus having a plurality of retardation plates arranged therein, although contrast and a color shift are improved, the improvement is not sufficient. Further, a satisfactory transmission factor of the liquid crystal display device cannot be obtained, and high contrast cannot be acquired in a range of a wide viewing angle.

BRIEF SUMMARY OF THE INVENTION

It is an object of the present invention to realize a liquid crystal display device adopting a homeotropic alignment mode having a high transmission factor and a wide viewing angle.

In order to achieve this object, according to a first aspect of the present invention, there is provided a liquid crystal display device comprising:

a first substrate having one surface on which a first electrode is provided;

a second substrate which is arranged to face the first substrate, and is provided with a second electrode which forms a pixel region in accordance with a region facing the first electrode on one surface facing the first substrate;

homeotropic aligning films formed on mutually faced surfaces of the first electrode and the second electrode, respectively;

a liquid crystal layer which is interposed between the first and second substrates and has a negative dielectric anisotropy a pair of polarizing plates each arranged on a side of the other surface opposite to the one surface of each of the first and second substrates; and a pair of optical compensation layers which are arranged respectively between the other surfaces of the first and second substrates and the pair of polarizing plates, and give a retardation having a value which is substantially ¼ of a wavelength λ of transmitted visible light to the transmitted visible light.

In this liquid crystal display device, it is preferable that each of the two optical compensation layers is formed of a first optical compensation plate in which values of Nx, Ny and Nz have a relationship of Nx>Ny>Nz and an in-plane retardation in a plane parallel to main surfaces of the pair of substrates has a value which is ¼ of a wavelength λ of visible light, where Nx is a refractive index in a first axial direction parallel to the main planes or surfaces of the pair of substrates, Ny is a refractive index in a second axial direction which is parallel to the main planes or surfaces of the substrates and vertical to the first axial direction and Nz is a refractive index of a third axial direction vertical to the main planes or surfaces of the substrates.

Furthermore, it is preferable that each of the optical compensation layers is formed of a first optical compensation plate in which values of Nx, Ny and Nz have a relationship of Nx>Ny>Nz, a value of an in-plane retardation R represented as (Nx−Ny)d is set to fall within a range of 120 to 160 nm and a value of a retardation Rz in a Z direction represented as {(Nx+Ny)/2−Nz} is set to fall within a range of 50 to 300 nm, where Nx is a refractive index in a first axial direction parallel to main surfaces of the pair of substrates, Ny is a refractive index in a second axial direction which is parallel to the main surfaces of the substrates and vertical to the first axial direction, Nz is a refractive index in a third axial direction vertical to the main surfaces of the substrates, and d is a thickness of the optical compensation layer.

In this case, it is preferable that the two first optical compensation plates are arranged in such a manner that their in-plane phase delaying axes in directions along which a refractive index is maximum or an in-plane phase advancing axes in directions along which a refractive index is minimum in a plane parallel to the main surfaces of the substrates become perpendicular to each other.

The pair of polarizing plates have optical axes perpendicular to each other and are arranged at an angle by which a polarization axis of one of the polarizing plates crosses the in-plane phase delaying axis or the in-plane phase advancing axis of the optical compensation plate adjacent thereto at 35° to 55°.

Further, it is preferable to further arrange each retardation plate between the two first optical compensation plates arranged on both outer sides of the pair of substrates and the polarizing plates arranged on the respective outer sides. The retardation plate is set in such a manner that values of Nx, Ny and Nz have a relationship of Nx>Ny≈Nz and a retardation R in a plane parallel to the main surfaces of the substrates has a value falling within a range of 240 to 300 nm.

In this case, it is preferable that the pair of polarizing plates have optical axes perpendicular to each other, the two first optical polarization plates disposed on both outer sides of the pair of substrates are arranged so that their in-plane phase delaying axes in directions along which a refractive index is maximum or their in-plane phase advancing axes in directions along which a refractive index is minimum in a plane parallel to the main surfaces of the substrates become perpendicular to each other, and the two first optical polarization plates are arranged in such directions as to cross optical axes of the polarizing plates adjacent thereto within a range of 5° to 25° or 65° to 85°, and the two retardation plates disposed on outer sides of the two first optical compensation plates are arranged so that their phase delaying axes in directions along which a refractive index is maximum or their phase advancing axes in directions along which a refractive index is minimum in a plane parallel to the main surfaces of the substrates become perpendicular to each other, and the two retardation plates are arranged such directions as to cross the in-plane phase delaying axes of the in-plane phase advancing axes of the first optical compensation plates adjacent thereto within a range of 50° to 70°.

Moreover, it is preferable to further respectively arrange between the pair of polarizing plates other or second optical compensation plates in addition to the retardation plates. The second optical compensation plates are set in such a manner that values of Nx, Ny and Nz have a relationship of Nx>Ny>Nz and a value of a retardation Rz in a Z direction represented as {(Nx+Ny)/2−Nz} falls within a range of 50 to 300 nm.

In this case, it is preferable that the pair of polarizing plates have optical axes perpendicular to each other, the second optical compensation plates are arranged respectively between the two retardation plates and the polarizing plate provided on the outer sides of the retardation plates and arranged in such a manner that in-plane phase delaying axes or in-plane phase advancing axes of these second optical compensation plates become perpendicular to each other and parallel to or perpendicular to optical axes of the polarizing plates adjacent thereto, the two first optical compensation plates disposed on both outer sides of the pair of substrates are arranged so that their in-plane phase delaying axes in directions along which a refractive index is maximum or in-plane phase advancing axes in directions along which a refractive index is minimum in a plane parallel to the main surfaces of the substrates become perpendicular to each other, and the two first optical compensation plates are arranged in such directions as to cross optical axes of the polarizing plates adjacent thereto within a range of 5° to 25° or 65° to 85°, and the two retardation plates respectively disposed on outer sides of the two first optical compensation plates are arranged so that their in-plane phase delaying axes each of which is a direction along which a refractive index is maximum in a plane parallel to the main surfaces of the substrates or their in-plane phase advancing axes each of which is a direction along which a refractive index is minimum become perpendicular to each other, and the two retardation plates are arranged in such directions as to cross the in-plane phase delaying axes or the in-plane phase advancing axes of the first optical compensation plates adjacent thereto within a range of 50° to 70°.

Additionally, where the two optical compensation plates and the two retardation plates are included, it is preferable to use a semi-transparent type liquid crystal panel in which a reflection film is formed on a part of one of the first electrode and the second electrode so that a transmission display region which controls light transmitted through the pair of substrates facing each other and a reflection display region which controls light reflected by the reflection film are formed in each pixel region formed of a region where these electrodes face each other.

In the liquid crystal display device having the optical compensation plates arranged on both outer sides of the pair of substrates, it is desirable to further arrange between the pair of polarizing plates two second optical compensation plates different from the first optical compensation plates. The second optical compensation plates are set in such a manner that values of Nx, Ny and Nz have a relationship of Nx>Ny>Nz and a value of a retardation Rz in a Z direction represented as {(Nx+Ny)/2−Nz} falls within a range of 50 to 300 nm.

In this case, it is desirable that the pair of polarizing plates have optical axes perpendicular to each other, the two first optical compensation plates arranged on both outer sides of the pair of substrates are arranged to face directions along which their in-plane phase delaying axes in directions along which a refractive index is maximum or their in-plane phase advancing axes in directions along which a refractive index is minimum in a plane parallel to the main surfaces of the substrates become perpendicular to each other and cross optical axes of the polarizing plates adjacent thereto within a range of 35° to 55°, and the two second optical compensation plates arranged respectively on outer sides of the two first optical compensation plates are arranged in such a manner that their in-plane phase delaying axes in directions along which a refractive index is maximum or their in-plane phase advancing axes in directions along which a refractive index is minimum in a plane parallel to the main surfaces of the substrates become parallel to or perpendicular to each other and become parallel to or perpendicular to the optical axes of the polarizing plates adjacent thereto.

In the liquid crystal display device according to the present invention, it is preferable that a first optical compensation plate is arranged between the outer surface of one of the pair of substrates and one of the pair of polarizing plate, the first optical compensation plate being set in such a manner that values of Nx, Ny and Nz have a relationship of Nx>Ny>Nz and a retardation in a plane parallel to the main surfaces of the substrates has a value which is ¼ of a wavelength λ of visible light, and that a retardation plate is arranged between the outer surface of the second substrate and the other one of the pair of polarizing plates, the retardation plate being set in such a manner that values of Nx, Ny and Nz have a relationship of Nx>Ny≈Nz and an in-plane retardation R in a plane parallel to the main surfaces of the substrate has a value within a range of 120 to 160 nm.

In this case, it is preferable that the first optical compensation plate and the retardation plate are arranged in such a manner that their in-plane phase delaying axes in directions along which a refractive index is maximum or their in-plane phase advancing axes in directions along which a refractive index is minimum in a plane parallel to the main surfaces of the substrates become perpendicular to each other, and the pair of polarizing plates have optical axes perpendicular to each other and are arranged to face directions along which their optical axes cross the in-plane phase delaying axes or in-plane phase advancing axes of the first optical compensation plate and the retardation plate adjacent thereto at 35° to 55°.

Moreover, it is preferable to further arrange second optical compensation plates different from the first optical compensation plate between the pair of polarizing plates. The second optical compensation plate is set in such a manner that values of Nx, Ny and Nz have a relationship of Nx>Ny>Nz and a value of a retardation Rz in a Z direction represented as {(Nx+Ny)/2−Nz} falls within a range of 50 to 300 nm.

In this case, it is desirable that the second optical compensation plates are arranged between the first optical compensation plate and one polarizing plate, and between the retardation plate and the other polarizing plate to become parallel to or perpendicular to the optical axis of each polarizing plate adjacent thereto, the first optical compensation plate and the retardation plate are arranged in such a manner that their in-plane phase delaying axes in directions along which a refractive index is maximum or their in-plane phase advancing axes in directions along which a refractive index is minimum in a plane parallel to the main surfaces of the substrates become perpendicular to each other, and the pair of polarizing plates have optical axes perpendicular to each other and are arranged to face directions along which their polarizing axes cross the in-plane phase delaying axes or in-plane phase advancing axes of the first optical compensation plate and the retardation plate adjacent thereto at 35° to 55°.

Additionally, in these liquid crystal display devices, it is possible to provide means for aligning a liquid crystal constituting the liquid crystal layer in such a manner that directors face a plurality of directions by application of the electric field.

Further, according to a second aspect of the present invention, there is provided a liquid crystal display device comprising:

a first substrate having a transparent first electrode provided on one surface side;

a second substrate which is arranged to face the one surface of the first substrate, and is provided with a transparent second electrode which forms a plurality of pixel region, where transmission type display is performed, in accordance with a region facing the first electrode on one surface facing the first substrate;

homeotropic aligning films formed on mutually faced surfaces of the first electrode and the second electrode, respectively;

a liquid crystal layer which is interposed between the substrates and has a negative dielectric anisotropy;

a pair of polarizing plates which are arranged on a side of the other surface opposite to the one surface of each of the first and second substrates;

two first optical compensation plates which are respective arranged between the substrates and the polarizing plates and set in such a manner that values of Nx, Ny and Nz have a relationship of Nx>Ny>Nz and a retardation having a value which is ¼ of a wavelength λ is given to transmitted light, where Nx is a refractive index in a first axial direction parallel to one surface of each of the substrates, Ny is a refractive index in a second axial direction parallel to one surface of each of the substrates and vertical to the first axial direction, and Nz is a refractive index in a third axial direction vertical to one surface of each of the substrates; and two second optical compensation plates which are arranged respectively between the first optical compensation plates and the polarizing plates and arranged in such a manner that values of Nx, Ny and Nz have a relationship of Nx>Ny>Nz and directions of their in-plane phase delaying axes along which a refractive index is maximum in a plane parallel to one surface of each of the substrates become perpendicular to or parallel to transmission axes of the polarizing plates adjacent thereto.

In this liquid crystal display device, it is preferable that the pair of polarizing plates have optical axes perpendicular to each other, and the two first optical compensation plates are arranged in such a manner that their in-plane retardations in a plane parallel to the main surfaces of the substrates have a value which is ¼ of a wavelength λ of visible light and directions of their in-plane phase delaying axes along which a refractive index is maximum in a plane parallel to the main surfaces of the substrates form substantially 45° with transmission axes of the polarizing plates adjacent thereto.

Furthermore, according to a third aspect of the present invention, there is provided a liquid crystal display device comprising:

one substrate having a transparent first electrode provided on one surface side;

a reflection film which is provided on a surface facing the one substrate and faces a part of the first electrode;

the other substrate which is arranged in a region including the reflection film and in which a second electrode is provided on a side of one surface thereof, the second electrode forming, in accordance with a region facing the first electrode, a pixel region constituting a reflection display region corresponding to the reflection film and a transmission display region other than the reflection;

homeotropic aligning films formed on mutually faced surfaces of the first electrode and the second electrode, respectively;

a liquid crystal layer which gives a retardation which is substantially half of a wavelength of light transmitted through the transmission display region of the pixel region to the light, is interposed between the substrates in such a manner that a layer thickness corresponding to the reflection region of the pixel region has a layer thickness which is substantially half of a layer thickness corresponding to the transmission display region, and has a negative dielectric anisotropy;

a pair of polarizing plates each arranged on a side of the other surface opposite to the one surface of each of the first and second substrates;

two first optical compensation plates which are arranged respectively between the substrates and the pair of polarizing plates and set in such a manner that values of Nx, Ny and Nz have a relationship of Nx>Ny>Nz, where Nx is a refractive index in a first axial direction parallel to one surface of each of the substrates, Ny is a refractive index in a second axial direction parallel to one surface of each of the substrates and vertical to the first axial direction, and Nz is a refractive index in a third axial direction vertical to main planes of the substrates; and two retardation plates which are arranged respectively between the first optical compensation plates and the polarizing plates, and arranged in such a manner that respective in-plane phase delaying axes of the first optical compensation plates adjacent thereto and retardation plates along which a refractive index shows a maximum value in a plane parallel to one surface of each of the substrates face a direction of substantially 45°, values of Nx, Ny and Nz have a relationship of Nx>Ny≈Nz and a value obtained by combining respective in-plane retardations of the mutually adjacent optical compensation plate and retardation plates has a value of an in-plane retardation which is substantially ¼ of a wavelength of transmitted light.

In this liquid crystal display device, it is preferable that the pair of polarizing plates have optical axes perpendicular to each other, the two first optical compensation plates disposed on both outer sides of the pair of substrates are arranged so that their in-plane phase delaying axes in directions along which a refractive index is maximum in a plane parallel to the main surfaces of the substrates become perpendicular to each other, and the two first optical compensation plates are arranged in such directions as to cross transmission axes of the polarizing plates adjacent thereto within a range of 5° to 25° or 65° to 85°, and the two retardation plates provided on outer sides of the two first optical compensation plates are arranged in such a manner their in-plane phase delaying axes in directions along which a refractive index is maximum in a plane parallel to the main surfaces of the substrates become perpendicular to each other.

According to the liquid crystal display device based on the first aspect of the present invention, since the two optical compensation layers which give a retardation having a value which is substantially ¼ of a wavelength λ of transmitted visible light to this visible light are arranged on both sides of the homeotropic alignment type liquid crystal cell, a transmission factor is increased.

Furthermore, as the optical compensation layer, there is preferably used the optical compensation plate set in such a manner that values of refractive indices Nx, Ny and Nz have a relationship of Nx>Ny>Nz and a retardation in a plane parallel to the main surfaces of the substrates has a value which is ¼ of a wavelength λ of visible light, or the optical compensation plate set in such a manner that values of Nx, Ny and Nz have a relationship of Nx>Ny>Nz and a value of an in-plane retardation R represented as (Nx−Ny)d is set within a range of 120 to 160 nm and a value of a retardation Rz in a Z direction represented as {(Nx+Ny)/2−Nz} is set within a range of 50 to 300 nm. Therefore, light which enters the liquid crystal display device can be converted into substantially circular polarized light to enter the liquid crystal cell, thereby improving a transmission factor.

Moreover, since the optical compensation layers are arranged on both sides of the liquid crystal cell, light which has been converted into linear polarized light through the polarizing plate can be converted into circular polarized light to enter the liquid crystal cell, and polarized light transmitted through the liquid crystal cell can be again converted into substantially linear polarized light to enter the polarizing plate on an exiting side, thereby realizing the liquid crystal display device having a high transmission factor and a wide viewing angle range.

In the liquid crystal display device having the optical compensation layers arranged on both sides of the liquid crystal cell, substantially uniaxial retardation plates are preferably further arranged between these optical compensation plates and the polarizing plates arranged on the outer sides of these optical compensation plates, each uniaxial retardation plate being set in such a manner that values of Nx, Ny and Nz have a relationship of Nx>Ny≈Nz and an in-plane retardation R in a plane parallel to the main surfaces of the substrates has a value falling within a range of 240 to 300 nm. As a result, it is possible to realize the semi-transparent reflection type liquid crystal display device which has a high transmission factor and a wide viewing angle range and can perform both reflection display and transmission display in which a color shift is reduced.

Additionally, in the liquid crystal display device having the optical compensation plates arranged on both sides of the liquid crystal cell or the liquid crystal display device having the optical compensation plate and the retardation plate on both sides of the liquid crystal cell, when another optical compensation plate which has a relationship of Nx>Ny>Nz and a retardation Rz in a Z direction represented as {(Nx+Ny)/2−Nz} having a value set to fall within a range of 50 to 300 nm is further arranged, the value of the retardation Rz in the Z direction can be sufficiently increased, thereby satisfactorily expanding the viewing angle range.

In the present invention, when the optical compensation plate is arranged on one surface of the liquid crystal panel and the uniaxial retardation plate which has a relationship of Nx>Ny≈Nz and an in-plane retardation R having a value falling within a range of 120 to 160 nm is arranged on the other side of the same, it is possible to obtain the liquid crystal display device having a high contrast and a sufficiently practically wide viewing angle.

In this case, when another optical compensation plate which has a retardation Rz in the Z direction having a value set within a range of 50 to 300 nm is arranged, the value of the retardation Rz in the Z direction can be sufficiently increased, and the viewing angle range can be expanded.

Additionally, according to the liquid crystal display device based on the second aspect of the present invention, the two first optical compensation plates each formed of a biaxial retardation plate which gives a retardation having a value which is ¼ of a wavelength λ of transmitted light are arranged on both sides of the homeotropic alignment type liquid crystal panel which performs transmission display, and the two optical compensation plates each formed of a biaxial retardation plate arranged in such a manner that a direction of an in-plane phase delaying axis becomes perpendicular to or parallel to a transmission axis of the polarizing plate adjacent thereto are arranged on outer sides of the first optical compensation plates. Therefore, retardations in the Z axis direction of these adjacent first and second optical compensation plates are added to provide a large retardation in the Z axis direction, thereby greatly improving viewing angle characteristics.

Further, according to the liquid crystal display device based on the third aspect of the present invention, the optical compensation plate formed of a biaxial retardation plate and the uniaxial retardation plate arranged in such a manner that its phase delaying axis crosses an in-plane phase delaying axis of the biaxial retardation plate at 45° are arranged on both sides of the homeotropic alignment type liquid crystal panel which performs transmission display and reflection display, whereby a value obtained by combining the in-plane retardations of the optical compensation plate and the retardation plate adjacent to each other becomes substantially ¼ of a wavelength of the transmitted light. Therefore, these optical compensation plate and retardation plate function as a broadband λ/4 plate. As a result, high contrast can be provided, practically sufficiently wide viewing angle can be obtained, and viewing angle dependence of a hue can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A to 2C are views illustrating an influence of a protruding portion formed on an aligning film given to liquid crystal molecules, in which FIG. 2A is a view showing alignment of a liquid crystal from a substrate side surface when an electric field is not applied, FIG. 2B is a view showing alignment of the liquid crystal from the substrate side surface when an electric field is applied, and FIG. 2C is a view showing alignment of the liquid crystal from a substrate front surface direction when an electric field is applied;

FIGS. 4A and 4B show each contrast distribution of the liquid crystal element with respect to a viewing angle, in which FIG. 4A is a view showing viewing angle characteristics of the first embodiment, and FIG. 4B is a view showing viewing angle characteristics of a comparative example;

DETAILED DESCRIPTION OF THE INVENTION

Embodiment 1

Figure 1:
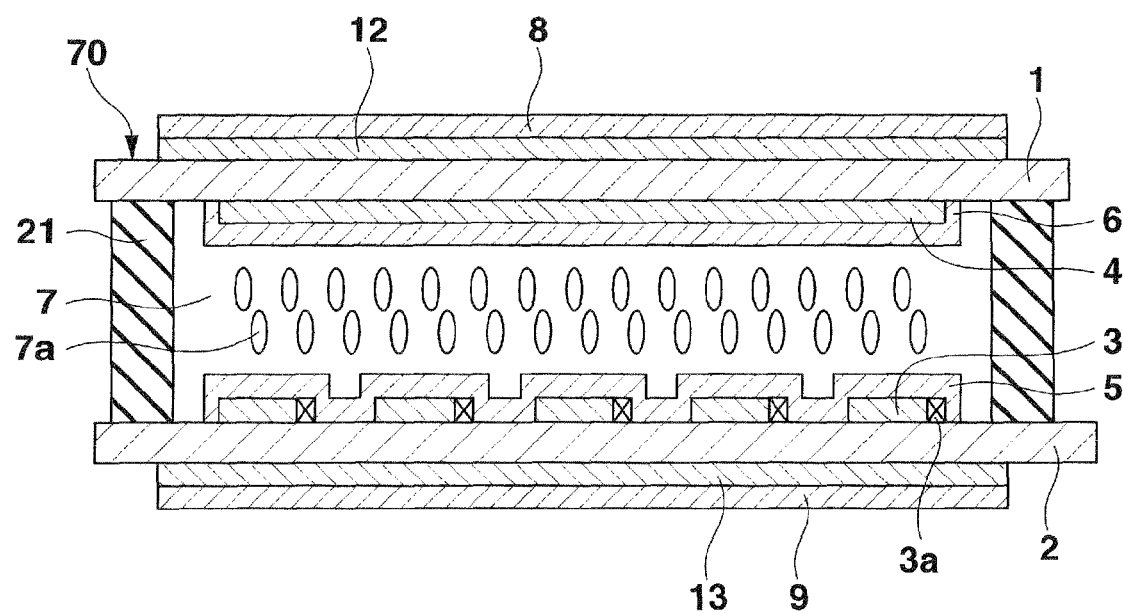
FIG. 1 is a view showing a configuration of a liquid crystal display device according to a first embodiment of the present invention.

As shown in FIG. 1, a liquid crystal display device according to a first embodiment is constituted of: a liquid crystal panel 70 formed of a pair of substrates 1 and 2, a plurality of pixel electrodes 3 and an opposed or common electrode 4 formed on inner surfaces of the respective substrates facing each other, aligning films 5 and 6 formed on surfaces of these electrodes 3 and 4, and a liquid crystal layer 7 interposed between the pair of substrates; a pair of polarizing plates 8 and 9 arranged to sandwich the pair of substrates 1 and 2 on outer sides of these substrates of the liquid crystal panel 70; two optical compensation layers 12 and 13 arranged respectively between the pair of polarizing plates 8 and 9 on both sides of the liquid crystal panel 70; and a sealing material 21 which joins the pair of substrates 1 and 2.

Each of the substrates 1 and 2 is a transparent substrate formed of, e.g., glass, and these substrates are arranged to face each other with the liquid crystal layer 7 therebetween.

Each of the pixel electrodes 3 and the opposed electrode 4 is a transparent electrode formed of, e.g., an indium tin oxide (ITO) film mainly containing indium oxide, and these electrodes are formed on the inner surfaces of the substrates 1 and 2 facing each other. This liquid crystal display device is formed of an active matrix type liquid crystal display device, each active element 3a is electrically connected with each of the pixel electrodes 3, the opposed electrode 4 is formed of a transparent electroconductive film which covers an entire display region, and each pixel is formed by a region where each pixel electrode 3 faces the opposed common electrode 4.

It is to be noted that this liquid crystal display device is not restricted to the active matrix type. For example, in case of a passive matrix type, the plurality of pixel electrodes 3 may be formed as signal electrodes to extend in a first direction in parallel, and the plurality of opposed electrodes 4 may be formed as scanning electrodes to extend in a second direction perpendicular to the signal electrodes 3.

Each of the aligning films 5 and 6 is formed of, e.g., a polymerized film of hexamethyldisiloxane, and these films are formed to cover the pixel electrodes 3 and the opposed electrode 4. Each of the aligning films 5 and 6 is a homeotropic aligning film having an alignment restricting force which vertically aligns liquid crystal molecules 7a in the vicinity of the aligning films, of the liquid crystal layer 7.

Figure 2A:
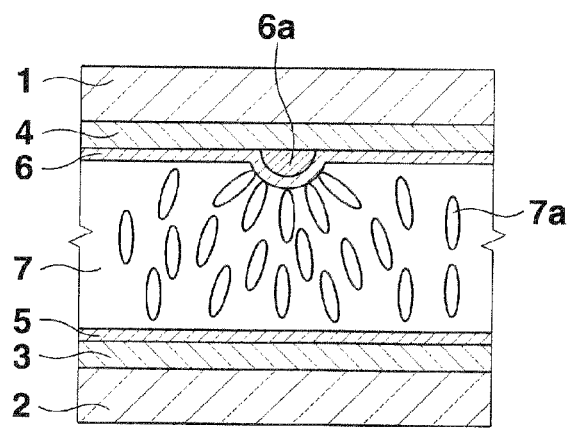

As shown in FIG. 2A which is a partially enlarged cross-sectional view of a part of the liquid crystal display device corresponding to one pixel, a small protrusion 6a is formed at a central part of each pixel region of the aligning film 6. The small protrusion 6a obtains alignment stability of liquid crystal molecules in each pixel region when a voltage is applied between the pixel electrode 3 and the opposed electrode 4 to change an alignment state so that the liquid crystal molecules fall.

The small protrusion 6a may be formed, for example by projecting a part of an inner surface of the electrode 4 and a forming an aligning film 6 having a uniform thickness on the inner surface of the electrode 4.

The liquid crystal layer 7 is constituted of a liquid crystal material demonstrating a negative dielectric anisotropy, and interposed in a region formed of the substrates 1 and 2 and the sealing material 21.

In this liquid crystal layer 7, when a voltage is not applied between the electrodes 3 and 4 facing each other (at the time of no voltage application), the liquid crystal molecules 7a are aligned to be vertical to main planes or surfaces of both the substrates by the alignment restricting forces of the aligning films 5 and 6 as shown in FIG. 1. At the time of voltage application, the liquid crystal molecules 7a behave to fall in parallel to the main surfaces of both the substrates due to the negative dielectric anisotropy. When a sufficiently high voltage is applied, the liquid crystal molecules are aligned in substantially parallel to the main surfaces of both the substrates.

Figure 2B:
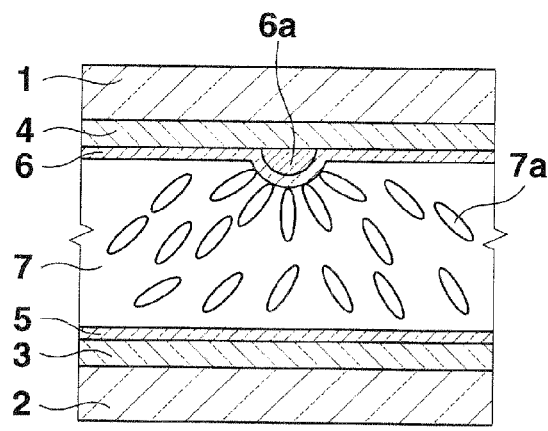
Figure 2C:
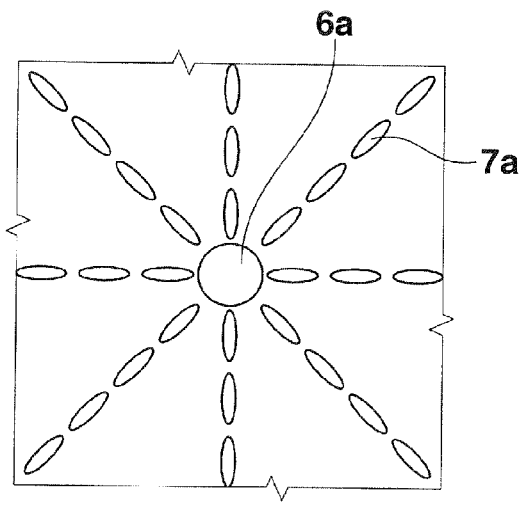

In this case, as shown in FIG. 2A schematically showing the part where the protrusion 6a of one pixel is formed, the liquid crystal molecules 7a in the vicinity of the protrusion 6a formed at the central part of each pixel region of the aligning film 6 are aligned to become vertical to the surface of the protrusion. Therefore, the liquid crystal molecules around this protrusion are aligned to be inclined with respect to the center of the pixel. This inclined alignment of the liquid crystal molecules in the vicinity of the center of the pixel gives an alignment tendency of falling toward the pixel center to the liquid crystal molecules 7a in the pixel. Therefore, when a voltage is applied between the pixel electrode 3 and the opposed electrode 4, as shown in FIG. 2B and FIG. 2C which shows FIG. 2B in a plan view, the liquid crystal molecules in the pixel region are aligned to fall in such a manner that their molecular long axes face all directions. As a result, it is possible to obtain an alignment state in which directors of the liquid crystal molecules face all directions in the pixel. As described above, when each protrusion 6a is provided in each pixel region, one alignment state with the protrusion 6a at the center can be obtained in accordance with each pixel region. Furthermore, the plurality of protrusions 6a may be arranged in one pixel. In this case, it is desirable to provide slits which divides the pixel region into a plurality of sub-regions to one of the electrodes forming the pixel region, and form each protrusion 6a at a substantially central part of each sub-region divided by the slits. According to this configuration, a radial alignment state with the protrusion 6a at the center can be obtained in accordance with each sub-region obtained by dividing one pixel region, and a plurality of domains can be formed in one pixel region.

The liquid crystal layer 7 is constituted in such a manner that a product $\Delta$nd of a birefringence $\Delta$n (an abnormal light refractive index $n_e$—a normal light refractive index $n_0$) of the liquid crystal and a gap (a thickness of the liquid crystal layer 7) d preferably becomes $\Delta$nd$\approx$350$\pm$100 nm (a range of 250 to 450 nm) and the liquid crystal molecules in the liquid crystal layer 7 are substantially uniformly vertically aligned with respect to the main surfaces of the substrates 1 and 2 when a voltage is not applied.

As shown in FIG. 1, the polarizing plates 8 and 9 arranged on both sides with the liquid crystal panel 70 therebetween are arranged on outer surface sides of the substrates 1 and 2, respectively. Moreover, as shown in FIG. 3, the plates 8 and 9 are arranged in such a manner that their optical axes 8a and 9a such as transmission axes or absorption axes become perpendicular to each other (a crossed nichol state)

Each of the two optical compensation layers 12 and 13 arranged on both sides of the liquid crystal panel 70 is constituted of an optical compensation plate formed of a norbornene-based resin having small wavelength dependence of a refractive index, and set in such a manner that values of refractive indices Nx, Ny and Nz in three directions perpendicular to each other have a relationship of Nx>Ny>Nz, a value of an in-plane retardation R represented as (Nx−Ny)d is set to fall within a range of 120 to 160 nm, preferably to 140 nm, and a value of a retardation Rz in a Z direction represented as {(Nx+Ny)/2−Nz} is set to fall within a range of 50 to 300 nm. Where Nx is a refractive index in a first axial direction parallel to the main planes of the pair of substrates, Ny is a refractive index in a second axial direction parallel to the main planes of the substrates and vertical to the first axial direction, Nz is a refractive index in a third axial direction (a film thickness direction) vertical to the main planes of the substrates, and d is a thickness of the optical compensation layer.

That is, a biaxial retardation plate whose refractive index Nz in the third direction as a thickness direction vertical to the main planes of the substrates is smaller than values of refractive indices in the other two axial directions is arranged between the pair of polarizing plates 8 and 9 on both sides of the liquid crystal panel 70. In this biaxial retardation plate, a value of its in-plane retardation R is set to a retardation which is substantially ¼ of an intermediate wavelength of a visible light band, and a value of a retardation Rz in the Z direction is set to a value which compensates a retardation of the liquid crystal layer 7 which varies with respect to light which obliquely enters the liquid crystal panel 7.

Figure 3:
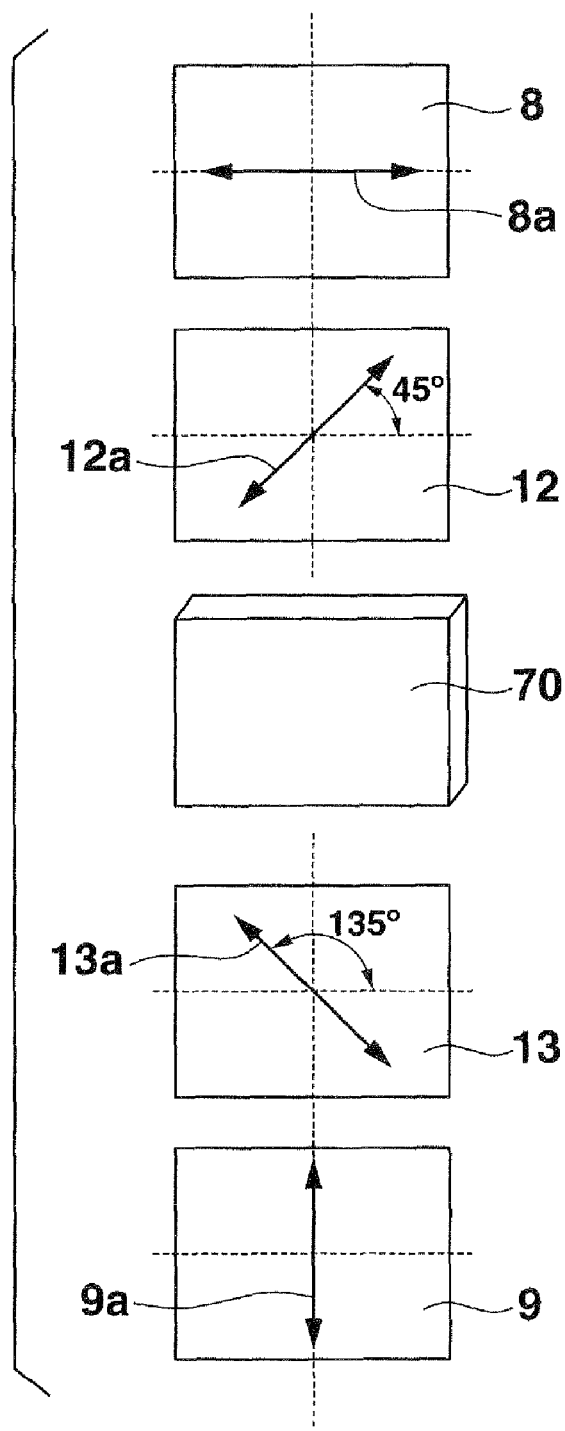
FIG. 3 is a view illustrating an arrangement of an optical axis of each optical element in the first embodiment.

Moreover, as shown in FIG. 3, the two optical compensating layers 12 and 13 are arranged in such a manner that their in-plane phase delaying axes 12a and 13a as directions along which a refractive index is maximum in a plane parallel to their plate surfaces or their in-plane phase advancing axes in directions perpendicular the in-plane phase delaying axes 12a and 13a and along which a refractive index is minimum are perpendicular to each other, and the respective in-plane phase delaying axes 12a and 13a or in-plane phase advancing axes cross polarization axes consisting of transmission axes 8a and 9a or absorption axes of the polarizing plates 8 and 9 adjacent thereto at substantially 45° in a range of 35° to 55°, i.e., within an allowable range of ±10° with 45° at the center (45°±10°).

An operation of the thus configured liquid crystal display apparatus will now be described.

In the liquid crystal display device shown in FIG. 1, in a state where a voltage is not applied between each pixel electrode 3 and the opposed electrode 4 (a state of no voltage application), an electric field is not generated between each pixel electrode 3 and the common electrode 4, and the liquid crystal molecules 7a in the liquid crystal layer 7 are vertically aligned with respect to the main planes of the substrates 1 and 2 as schematically shown in FIG. 1. Therefore, linear polarized light transmitted through the polarizing plate 9 on a rear side opposite to an observation side is converted into circular polarized light by the optical compensation plate 13 on the rear side and enters the liquid crystal layer 7 of the liquid crystal panel 70. This light is transmitted as the circular polarized light without optically being affected by the liquid crystal layer 7 in which the liquid crystal molecules 7a are vertically aligned, again converted into to the original linear polarized light by the optical compensation layer 12 on the observation side, enters the polarizing plate 8 arranged in a crossed nichol state on the observation side as the linear polarized light having a polarization plane parallel to the absorption axis of the polarizing plate 8, and is absorbed by this polarizing plate 8 on the observation side, thereby providing black (dark) display.

When a voltage corresponding to display data of a pixel is applied between each pixel electrode 3 and the opposed electrode 4 (a state of voltage application), an electric field is generated between these electrodes. The liquid crystal molecules 7a are inclined in accordance with an electric field intensity, and an alignment state of the liquid crystal molecules 7a varies between a homeotropic alignment state where the liquid crystal molecules 7a in the liquid crystal layer 7a are vertically aligned with respect to the substrate main surfaces (the main surfaces of the substrates 1 and 2) to a homogeneous alignment state where the liquid crystal molecules are aligned in parallel to the substrate main surfaces.

When a sufficiently high electric field is applied to the liquid crystal layer 7, the liquid crystal molecules 7a are aligned in substantially parallel to the substrate main planes and in a radial pattern around the protrusion 6a provided at the center of the pixel or the pixel divided sub-region. The linear polarized light transmitted through the polarizing plate 9 on the rear side positioned on a lower side in the figure is converted into circular polarized light which rotates in one rotational direction to enter the liquid crystal layer 7 since an in-plane retardation of the optical compensation layer 13 on the rear side has a retardation having a value which is substantially ¼ of a wavelength of visible light and the in-plane phase delaying axis 13a or phase advancing axis of the optical compensation layer 13 crosses the transmission axis 9a of the polarizing plate 9 at an angle of substantially 45°.

The linear polarized light which has entered the liquid crystal layer 7 is converted into circular polarized light which rotates in a reverse direction of one direction mentioned above due to the retardation of the liquid crystal layer 7 which is substantially λ/2, and enters the optical compensation layer 12. The optical compensation plate 12 is likewise set in such a manner that its in-plane retardation has a retardation having a value which is substantially ¼ of a wavelength λ of visible light, and its phase delaying axis 12a or phase advancing axis becomes perpendicular to the phase delaying axis 12a or phase advancing axes of the optical compensation layer 13 on the rear side. Therefore, the circular polarized light which has entered the optical compensation layer 12 and rotates in one direction is converted into linear polarized light having a polarization plane perpendicular to a polarization plane of the linear polarized light which has been transmitted through the polarizing plate 9, and enters the polarizing plate 8. The transmission axis 8a of the polarizing plate 8 on the observation side is arranged to be perpendicular to the transmission axis 9a of the polarizing plate 9 on the rear side. Therefore, the linear polarized light transmitted through the optical compensation layer 12 is transmitted through the polarizing plate 8, thereby providing white display (bright). A transmission light intensity I in this case can be represented by the following expression:

$$I = I_0 \sin^2(\pi \Delta n d/\lambda) \qquad (1)$$

where λ is a wavelength of light and $I_0$ is an average intensity of light.

As represented by this Expression 1, the transmission light intensity I does not include an azimuth angle θ of a director of each liquid crystal molecule as a parameter, and hence light is uniformly transmitted through an entire region of each pixel, thereby obtaining a high transmission factor.

On the contrary, when the optical compensation plates 12 and 13 do not have in-plane retardations, the transmission light intensity I can be represented by the following expression:

$$I = I_0 \sin^2(\pi \Delta n d/\lambda) \sin^2(2\theta) \qquad (2)$$

where θ is an angle formed between a liquid crystal director and the polarization axis 8a or 9a as seen from a normal line direction of the substrate main planes.

In Expression 2, as to the transmission light intensity I, a maximum transmission factor can be obtained when θ=±45°, and I=0 is achieved when θ=0°. In case of the liquid crystal display device in which the liquid crystal molecules 7a are aligned in a radial pattern in each pixel when an electric field is applied to the liquid crystal layer 7, a region or group of the liquid crystal molecules 7a which falls in substantially the same direction as the optical axes 8a and 9a of the polarizing plates 8 and 9 (θ=0°) has the transmission factor I=0, and a dark part is generated in a radial pattern in each pixel as seen from the normal line direction of the substrate main surfaces, whereby the transmission factor is low.

Additionally, a retardation in the liquid crystal layer 7 in an obliquely inclined direction when no voltage is applied can be simply represented by the following expression:

$$\Delta n d_{(\phi)} = \{n_e n_0 / (n_e^2 \cos^2\phi + n_0^2 \sin^2\phi)^{-1/2} - n_0\} \times (d/\cos\phi) \qquad (3)$$

where $n_e$ is an abnormal light refractive index of the liquid crystal layer 7, $n_0$ is a normal light refractive index of the liquid crystal, and φ is an angle of inclination from the substrate normal line direction toward the substrate horizontal surfaces.

As represented by this Expression 3, a value of $\Delta n d_{(\phi)}$ is increased as the angle φ of inclination from the substrate normal line direction toward the substrate horizontal surfaces is increased.

On the other hand, retardation Rz of each of the optical compensation layers 12 and 13 in the thickness direction can be represented by the following expression:

$$Rz = \{(Nx+Ny)/2 - Nz\} \times d \qquad (4)$$

where d is a thickness of each of the optical compensation layers 12 and 13.

Therefore, a value of the retardation Rz in the Z direction of the optical compensation layers 12 and 13 is set to cancel out an increment of the retardation in the substrate normal line direction at the predetermined angle φ inclined from the substrate normal line. In this embodiment, a value of the retardation Rz in the Z direction of the optical compensation layers 12 and 13 is set to fall within a range of 50 to 30 nm. A change in contrast and brightness when observing from a direction inclined with respect to the substrate normal line direction can be reduced and a viewing angle range can be expanded by these optical compensation layers 12 and 13, thereby compensating tone reversal due to a viewing angle φ.

As described above, according to the liquid crystal display device of this embodiment, since a value of the in-plane retardation R of each of the optical compensation layers 12 and 13 having the relationship of Nx>Ny>Nz is set to substantially λ/4, occurrence of a dark part in the display pixel which is a problem in white display based on application of a voltage between each pixel electrode 3 and the opposed electrode 4 can be eliminated, and a high transmission factor can be obtained. Further, in the liquid crystal display device according to this embodiment, since a value of the retardation Rz in the Z direction of each of the optical compensation layers 12 and 13 is set to fall within a range of 50 to 300 nm, a viewing angle range can be expanded, and tone reversal can be suppressed.

Figure 4A:
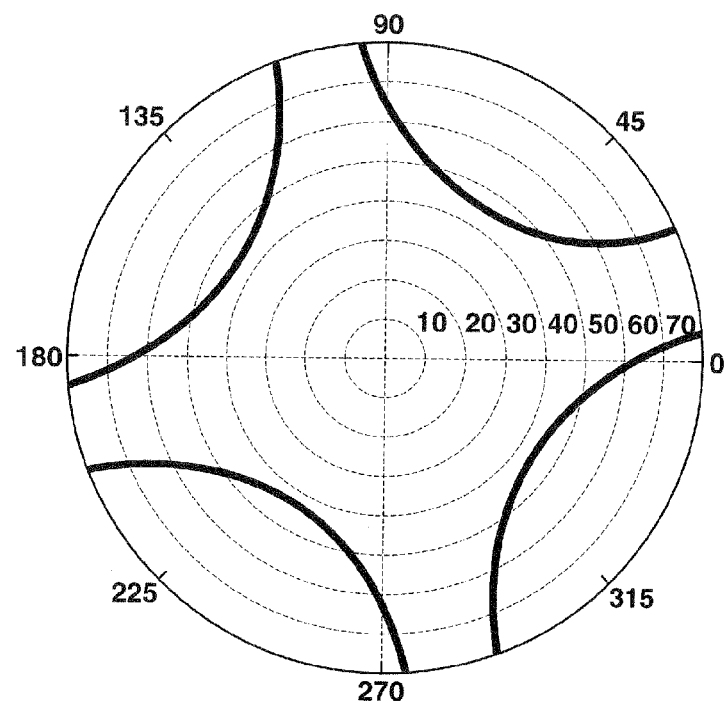
Figure 4B:
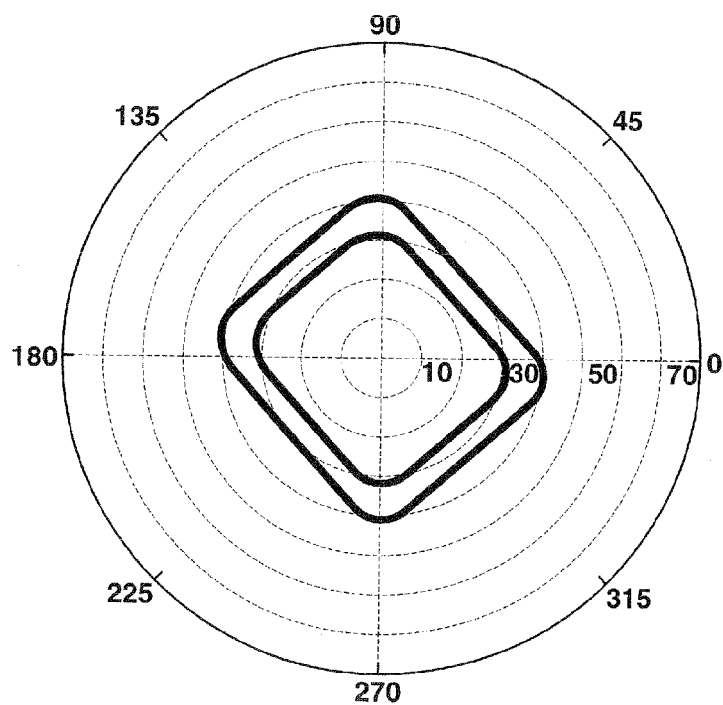

FIG. 4A shows a viewing angle and a contrast distribution of the liquid crystal display device having the optical compensation layers, according to this embodiment and FIG. 4B shows a contrast distribution to an angle (a viewing angle) in an observation direction with respect to the substrate normal line direction in a liquid crystal display device having no optical compensation layer, as a comparative example. As shown in the figures, in the comparative example which does not have the optical compensation layers 12 and 13, a region where contrast is not smaller than 10 falls within a range of approximately 30° to 40° as indicated by solid lines, and a viewing angle range is very narrow. On the contrary, in case of the liquid crystal display device according to this embodiment in which the optical compensation layers 12 and 13 are provided, a region where contrast is not smaller than 10 is expanded to a range of 160° in both vertical and horizontal directions as indicated by a solid line.

As described above, according to the liquid crystal display device of this embodiment, a VA (Homeotropic alignment) mode is adopted, and there are provided the liquid crystal panel in which the protrusion 6a is provided at the center of each pixel (or a divided sub-region of a pixel) so that the liquid crystal molecules 7a are aligned in a radial pattern from this pixel center, and the optical compensation layers 12 and 13 arranged on both sides of the liquid crystal panel in such a manner that values of Nx, Ny and Nz have the relationship of Nx>Ny>Nz and the retardation in a plane parallel to the main surfaces of the substrates 1 and 2 has a value which is ¼ of a wavelength λ of visible light. As a result, display with a high transmission factor and high contrast can be performed, and adopting the optical compensation plates 12 and 13 having a value of the retardation Rz in the Z direction falling within a range of 50 to 300 nm enables display with a wide viewing angle.

Embodiment 2

Figure 5:
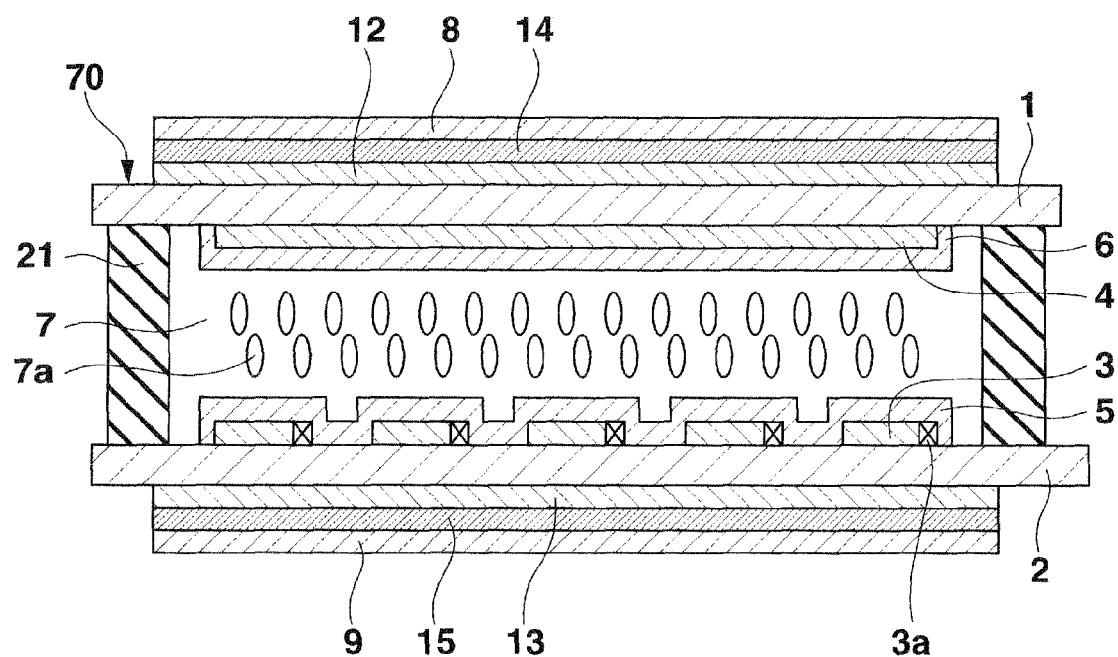
FIG. 5 is a view showing a configuration of a liquid crystal display device according to a second embodiment of the present invention.

Although the description has been given as to the liquid crystal display device in which a pair of optical compensation layers 12 and 13 are arranged on both sides of the liquid crystal panel 70 in the first embodiment, the object of the present invention can be likewise achieved by additionally arranging another optical compensation layer or plates 14 and 15 different from the optical compensation layers 12 and 13 on both sides of the liquid crystal panel 70 as shown in FIG. 5. When the other two optical compensation layers 14 and 15 different from the former layers are arranged on both sides of the liquid crystal panel 70 in this manner, a value of the retardation Rz in the R direction can be sufficiently increased, and viewing angle dependence of contrast can be sufficiently compensated. Since a configuration of this liquid crystal display device according to the second embodiment is the same as that in the first embodiment expect that the other optical compensation plates 14 and 15 are additionally arranged on both sides of the liquid crystal panel 70 in the liquid crystal display device depicted in FIG. 1, like reference numerals denote the like members, thereby eliminating their explanation.

As shown in FIG. 5, the liquid crystal display device according to this embodiment is provided with a liquid crystal panel 70, a first optical compensation layer 12 arranged on an observation side of this liquid crystal panel 70 and a second optical compensation plate 14 arranged on the observation side. Furthermore, it includes a first optical compensation plate 13 on an opposite side of the observation side of the liquid crystal panel 70 and a second optical compensation plate 15 arranged on a rear side.

The second optical compensation layers 14 and 15 are optical compensation plates 14 and 15 set in such a manner that values of refractive indices Nx, Ny and Nz have a relationship of Nx>Ny>Nz and a value of a retardation Rz in a Z direction falls within a range of 50 to 300 nm. These layers may or may not have an in-plane retardation R, and its value is an arbitrary value.

That is, the first optical compensation layer 12 on the observation side which is the same as that in the first embodiment is arranged on the observation side of the liquid crystal panel 70 in such a manner that its in-plane phase delaying axis 12a orients a direction of 45° with respect to a horizontal direction when observing the liquid crystal display device. The outermost polarizing plate 8 is arranged in such a manner that its transmission axis 8a becomes parallel to the horizontal direction. Further, the second optical compensation layer 14 on the observation side is arranged between the first optical compensation layer 12 on the observation side and the polarizing plate 8 on the observation side in such a manner that its in-plane phase delaying axis 14a becomes parallel to the transmission axis 8a of the polarizing plate 8 on the observation side.

Figure 6:
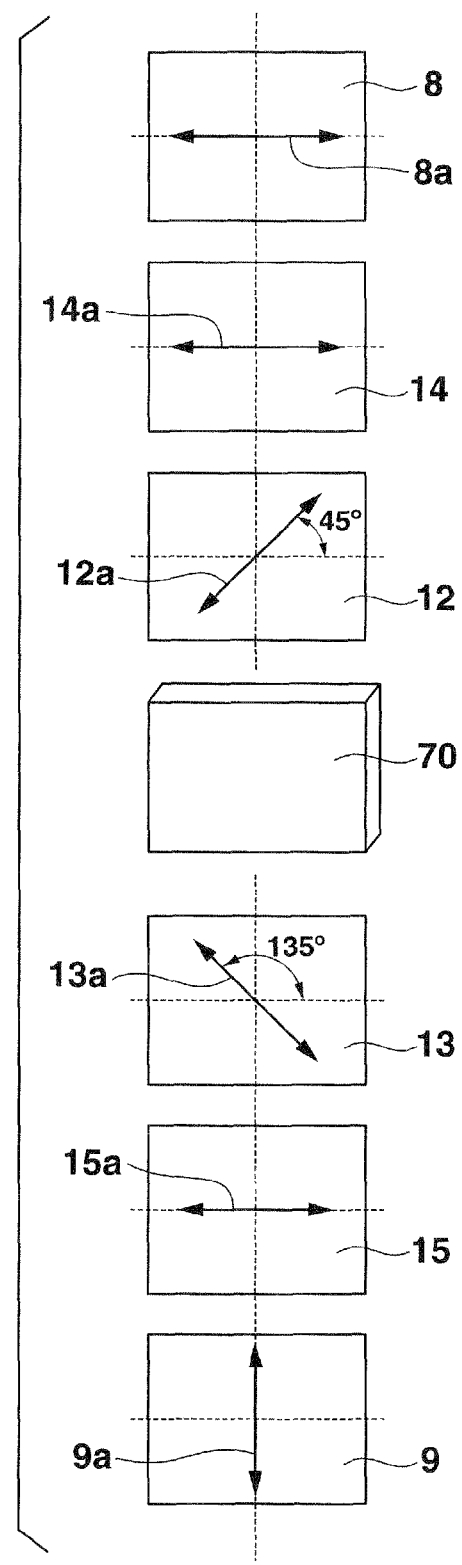
FIG. 6 is a view illustrating an arrangement of an optical axis of each optical element in the second embodiment of the present invention.

Moreover, as shown in FIG. 6, the first optical compensation layer 13 on the rear side which is the same as that in the first embodiment is arranged on the opposite side of the observation side of the liquid crystal panel 70 in such a manner that its in-plane phase delaying axis 13a orients a direction of 135° with respect to a horizontal direction when observing the liquid crystal display device. The polarizing plate 9 closest to the rear side is arranged in such a manner that its transmission axis 9a becomes perpendicular to the horizontal direction. Additionally, the second optical compensation layer 15 on the rear side is arranged between the first optical compensation layer 13 on the rear side and the polarizing plate 9 on the rear side in such a manner that its in-plane phase delaying axis 15a becomes perpendicular to the transmission axis 9a of the polarizing plate 9 on the rear side.

In this manner, the second optical compensation layers 14 and 15 are arranged in such a manner that their in-plane phase delaying axes 14a and 15a respectively become parallel to or perpendicular to the transmission axes 8a and 9a of the polarizing plates 8 and 9 adjacent thereto. According to the arrangement of these optical axes, these plates do not optically act on linear polarized light having a polarization plate parallel to the transmission axes 8a and 9a or the absorption axes of the respective polarizing plates 8 and 9. Therefore, each pair on the same side constituted of the first optical compensation layers 12 and 13 and the second optical compensation layers 14 and 15 arranged on both sides of the liquid crystal panel 70 functions as one optical compensation plate in which values of the retardation Rz in the Z direction are added.

Further, according to the liquid crystal display device of the second embodiment, like the first embodiment, in a state of no voltage application where a voltage is not applied to each pixel electrode 3 and the opposed electrode 4, linear polarized light transmitted through the polarizing plate 9 on the rear side is converted into circular polarized light by the second optical compensation layer 15 and the first optical compensation layer 13 on the rear side to enter the liquid crystal layer 7 of the liquid crystal panel 70. This light is transmitted through the liquid crystal layer 7 as the circular polarized light, again converted into the original linear polarized light by the first optical compensation layer 12 and the second optical compensation layer 14 on the observation light, and absorbed into the polarizing plate 8 on the observation side which is arranged in a crossed nichol state, thereby providing black (dark) display.

In a state of voltage application where a sufficiently high voltage is applied between each pixel electrode 3 and the opposed electrode 4, linear polarized light transmitted through the polarizing plate 9 on the rear side is converted into circular polarized light by the second and first optical compensation layers 15 and 13 on the rear side to enter the liquid crystal layer 7 of the liquid crystal panel 70. This light is converted into circular polarized light rotating in a reverse direction by the liquid crystal layer 7 aligned to have a retardation of $\lambda/2$, converted into linear polarized light whose polarization plane is rotated 90° with respect to a polarization plane of the linear polarized light transmitted through the polarizing plate 9 on the rear side by the first and second optical compensation layers 12 and 14 on the observation side, and transmitted through the polarizing plate 8 on the observation side which is arranged in a crossed nichol state, thereby obtaining white (bright) display.

Further, light which enters from a direction inclined with respect to a normal line of the liquid crystal display device is changed in such a manner that a retardation of each of the first and second optical compensation layers is increased in accordance with an inclination angle of this light. Therefore, a change in retardation caused when the light obliquely enters the liquid crystal layer 7 can be compensated by a change in retardation of each of the first and second optical compensation layers, thereby expanding a viewing angle range.

As described above, according to the second embodiment, arranging the paired first optical compensation layers and the paired second optical compensation plates on both sides of the liquid crystal panel 70 can sufficiently increase a value of the retardation Rz in the Z direction, thus satisfactorily compensating visual angle dependence of contrast.

Embodiment 3

Although the description has been given as to the liquid crystal display device in which the optical compensation layers 12 and 13 are arranged on both sides of the liquid crystal panel in the first embodiment, the present invention is not restricted thereto. The optical compensation layer 13 on the opposite side of the observation side of the liquid crystal panel 70 in FIG. 1 may be substituted with another optical compensation layer or plate (an optical compensation layer 16) having different optical characteristics. Since a configuration of this liquid crystal display device according to the third embodiment is the same as that in the first embodiment expect that one optical compensation layer arranged on one side of the liquid crystal panel 70 is substituted with another optical compensation layer having different optical characteristics, like reference numerals denote like members, thereby eliminating their explanation.

Figure 7:
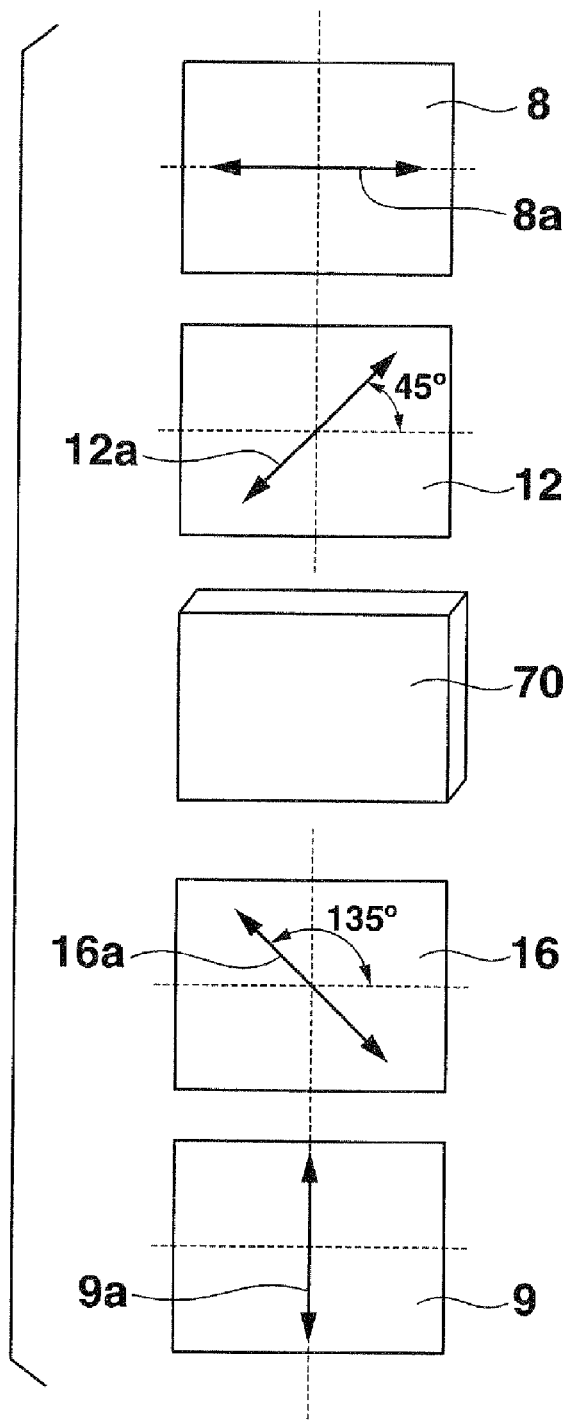
FIG. 7 is a view illustrating an arrangement of an optical axis of each optical element a third embodiment of the present invention.

As shown in FIG. 7, the liquid crystal display device according to this embodiment is constituted of: a liquid crystal panel 70; a first optical compensation layer 12 arranged on an observation side of this liquid crystal panel 70; the other optical compensation plate 16 arranged on a rear side opposite to the observation side of the liquid crystal panel 70; and a pair of polarizing plates 8 and 9 arranged with the liquid crystal panel 70, the first optical compensation layer 12 and the other optical compensation layer 16 therebetween.

The other optical compensation layer is formed of a retardation plate 16 set in such a manner that values of Nx, Ny and Nz have a relationship of Nx>Ny≈Nz (Ny and Nz are substantially equal to each other, and Nx is larger than Ny) and an in-plane retardation R in a plane parallel to main surfaces of substrates has a value falling within a range of 120 to 160 nm.

The first optical compensation layer 12 and the retardation plate 16 are arranged in such a manner that their in-plane phase delaying axes 12a and 16a each of which is a direction along which a refractive index is maximum or their in-plane phase advancing axes each of which is a direction along which a refractive index is minimum in a plane parallel to the main surfaces of the substrates become perpendicular to each other. The pair of polarizing plates 8 and 9 are arranged in such a manner that their optical axes 8a and 9a become perpendicular to each other and polarization axes 8a and 9a of the respective polarizing plates 8 and 9 cross the phase delaying axes 12a and 16a or the phase advancing axes of the first optical compensation layer 12 and the retardation plate 16 adjacent thereto within a range of 35° to 55° which is substantially 45°.

In this liquid crystal display device, like the first embodiment, when a sufficiently high electric field is applied to the liquid crystal layer 7, an in-plane retardation of the first optical compensation layer 12 arranged on one side of the liquid crystal panel 70 is substantially $\lambda/4$ of transmitted light, an in-plane retardation of the retardation plate 16 arranged on the rear side of the liquid crystal panel is also $\lambda/4$, and the in-plane phase delaying axis 12a of the first optical compensation layer 12 and the phase delaying axis 16a of the retardation plate 16 are perpendicular to each other and cross the transmission axes 8a and 9a of the polarizing plates 8 and 9 adjacent thereto at substantially 45°. Therefore, linear polarized light transmitted through the polarizing plate 9 arranged on the rear side is converted into circular polarized light which rotates in one rotational direction by the retardation plate 16 to enter the liquid crystal layer 7, and converted into circular polarized light which rotates in a reverse direction of the one direction by the liquid crystal layer 7 to enter the first optical compensation layer 12 on the observation side. This light is converted into linear polarized light whose polarization plane is rotated 90° with respect to a polarization plane of the linear polarized light when entered the retardation plate 16 by the optical compensation layer 12 on the observation side, enters the polarizing plate 8 on the observation side, and is transmitted through the polarization plate 8, thereby obtaining bright display.

Therefore, a high transmission factor can be obtained to enhance brightness, and contrast can be increased.

Further, since the first optical compensation layer 12 is arranged on the observation side of the liquid crystal panel 70, an increment of a retardation in a substrate normal line direction at an angle $\phi$ inclined from the substrate normal line can be canceled out by the retardation Rz in the Z direction of this first optical compensation layer 12, and a region where contrast is not smaller than 10 is expanded to a range of 140°, thus improving viewing angle characteristics.

Embodiment 4

Figure 8:
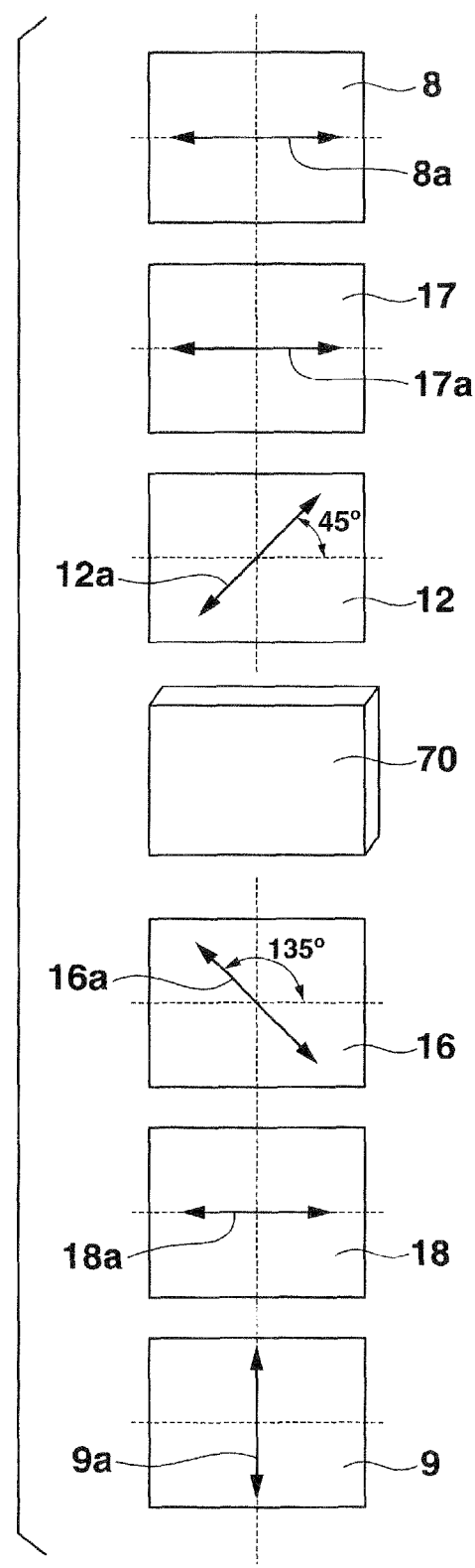
FIG. 8 is views illustrating an arrangement of an optical axis of each optical element in a fourth embodiment of the present invention.

Although the description has been given as to the liquid crystal display device in which one first optical compensation layer 12 is arranged on one side of the liquid crystal panel 70 and the retardation plate 16 formed of the other optical compensation layer having different optical characteristics is arranged on the other side of the same in the third embodiment, the object of the present invention can be likewise achieved when other optical compensation layers or plates are additionally arranged respectively on outer sides of the first optical compensation layer 12 and the other optical compensation layer (the retardation plate 16) arranged on both sides of the liquid crystal panel 70 as shown in FIG. 8. When the two other optical compensation layers or plates 17 and 18 are further arranged on both sides of the liquid crystal panel 70 in this manner, a value of a retardation Rz in a Z direction can be sufficiently increased, and viewing angle dependence of contrast can be satisfactorily compensated. Since a configuration of this liquid crystal display device according to the fourth embodiment is the same as that in the third embodiment except that other optical compensation layers 17 and 18 are additionally arranged respectively on both sides of the liquid crystal panel 70 in the liquid crystal display device shown in FIG. 7, like reference numerals denote like members, thereby eliminating their explanation.

As shown in FIG. 8, the liquid crystal display device according to this embodiment is provided with: a liquid crystal panel 70; a first optical compensation layer 12 arranged on an observation side of this liquid crystal panel 70; and a second optical compensation layer 17 arranged on the observation side. The display device further includes a retardation plate 16 on a rear side opposite to the observation side of the liquid crystal panel 70 and a second optical compensation layer 18 arranged on the rear side.

The second optical compensation layers 17 and 18 are optical compensation plates set in such a manner that values of refractive indices Nx, Ny and Nz have a relationship of Nx>Ny>Nz and a value of a retardation Rz in a Z direction falls within a range of 50 nm to 300 nm. They may or may not have an in-plane retardation R, and its value is an arbitrary value.

That is, the optical compensation layer 12 on the observation side which is the same as that in the third embodiment is arranged on the observation side of the liquid crystal panel 70 in such a manner that its in-plane phase delaying axis 12 faces a direction of 45° with respect to a horizontal direction when observing the liquid crystal display device. The polarizing plate 8 closest to the observation side is arranged in such a manner that its transmission axis 8a becomes parallel to the horizontal direction, and the second optical compensation layer 17 on the observation side is arranged between the first optical compensation layer 12 on the observation side and the polarizing plate 8 on the observation side in such a manner that its in-plane phase delaying axis 17a becomes parallel to the transmission axis 8a of the polarizing plate 8 on the observation side.

The retardation plate 16 which is the same as that in the third embodiment is arranged on the rear side opposite to the observation side of the liquid crystal panel 70 in such a manner that its in-plane phase delaying axis 16a orients a direction of 135° with respect to a horizontal direction when observing the liquid crystal display device. The polarizing plate 9 on the rearmost side is arranged in such a manner that its transmission axis 9a becomes perpendicular to the horizontal direction, and the second optical compensation plate 18 on the rear side is arranged between the retardation plate 16 on the rear side and the polarizing plate 9 on the rear side in such a manner that its in-plane phase delaying axis 18a becomes perpendicular to the transmission axis 9a of the polarizing plate 9.

The second optical compensation plates 17 and 18 are arranged in such a manner that their in-plane phase delaying axes 17a and 18a become parallel to or perpendicular to the transmission axes 8a and 9a of the polarizing plates 8 and 9 adjacent thereto in this way. According to the arrangement of these optical axes, there is no optical function with respect to linear polarized light having a polarization plane parallel to the transmission axes 8a and 9a or absorption axes of the respective polarizing plates 8 and 9. Therefore, the first optical compensation layer 12 and the second optical compensation layer 17 arranged on the observation side of the liquid crystal panel 70 function as one optical compensation layer in which values of the respective retardations Rz in the Z direction are added.

Furthermore, according to this liquid crystal display device of the fourth embodiment, like the third embodiment, in a state of no voltage application where voltage is not applied between each pixel electrode 3 and an opposed electrode 4 with respect to incident light from the rear side which is substantially parallel to a normal line direction of this liquid crystal display device, linear polarized light transmitted through the polarizing plate 9 on the rear side is transmitted through the second optical compensation layer 18 on the rear side without undergoing an optical function to enter the retardation plate 16. This light is converted into circular polarized light by this retardation plate 16 to enter the liquid crystal layer 7 of the liquid crystal panel 70. This light is transmitted through the liquid crystal layer 7 as the circular polarized light, again converted into the original linear polarized light by the first optical compensation layer 12 on the observation side to enter the second optical compensation layer 17. This light is transmitted through this second optical compensation layer 17 without undergoing the optical function and absorbed into the polarizing plate 8 on the observation side arranged in a crossed nichol state, thereby providing black (dark) display.

In a voltage applied state where a sufficiently high voltage is applied between each pixel electrode 3 and the opposed electrode 4, linear polarized light transmitted through the polarizing plate 9 on the rear side is transmitted through the second optical compensation layer 18 on the rear side without undergoing the optical function to enter the retardation plate. This light is converted into circular polarized light by this retardation plate 16 to enter the liquid crystal layer 7 of the liquid crystal panel 70. It is converted into circular polarized light rotating in a reverse direction by the liquid crystal layer 7 aligned to have a retardation of λ/2. This light is converted into linear polarized light whose polarization plane is rotated 90° with respect to a polarization plane of the linear polarized light transmitted through the polarizing plate 9 on the rear side by the first optical compensation layer 12 on the observation side to enter the second optical compensation layer 17. It is transmitted through this second optical compensation layer 17 without undergoing the optical function and further transmitted through the polarizing plate 8 on the observation side arranged in the crossed nichol state, thereby providing white (bright) display.

Moreover, the retardation of each of the first and second optical compensation layers or plates is changed to increase in accordance with an inclination angle of light which enters from an obliquely inclined direction with respect to the normal line of the liquid crystal display device. Therefore, a change in retardation generated due to oblique incidence of light with respect to the liquid crystal layer 7 can be compensated by a change in retardation of each of the first and second optical compensation layers, thereby expanding a viewing angle range.

As described above, according to the fourth embodiment, the first and second optical compensation layers 12 and 17 are arranged on one side of the liquid crystal panel 70, and the retardation plate 16 and the second optical compensation layer 18 are arranged on the other side of the same. As a result, a value of the retardation Rz in the Z direction can be sufficiently increased, thereby satisfactorily compensating viewing angle dependence of contrast.

Embodiment 5

The liquid crystal display device according to the present invention can be applied to a semi-transparent reflection type liquid crystal display device by arranging a retardation plate between the pair of polarizing plates 8 and 9 in the first embodiment. The fifth embodiment applied to this semi-transparent reflection type liquid crystal display device will now be described with reference to FIGS. 9 and 10.

Figure 9:
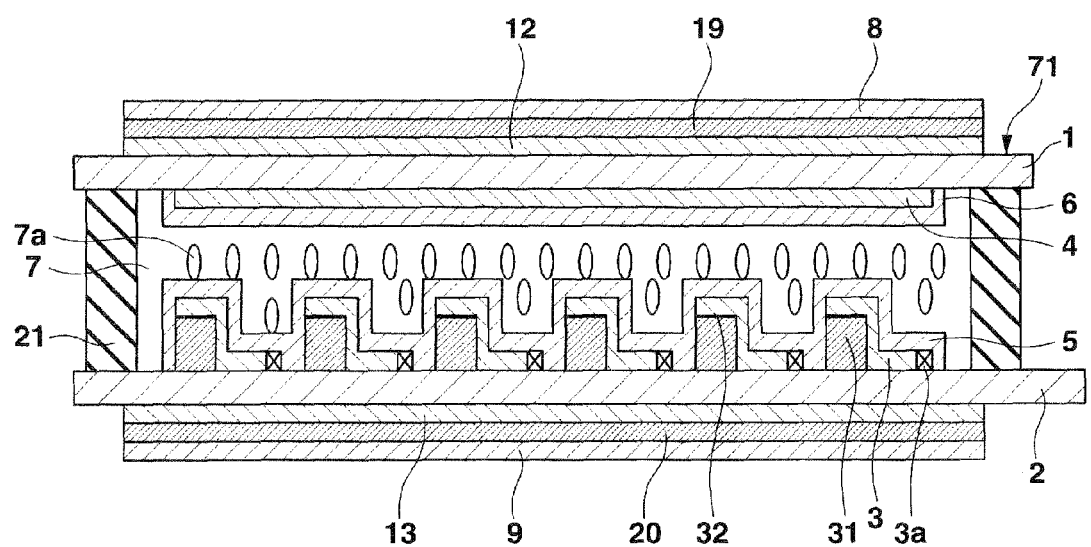
FIG. 9 is a view showing a configuration of a liquid crystal display device according to a fifth embodiment of the present invention.
Figure 10:
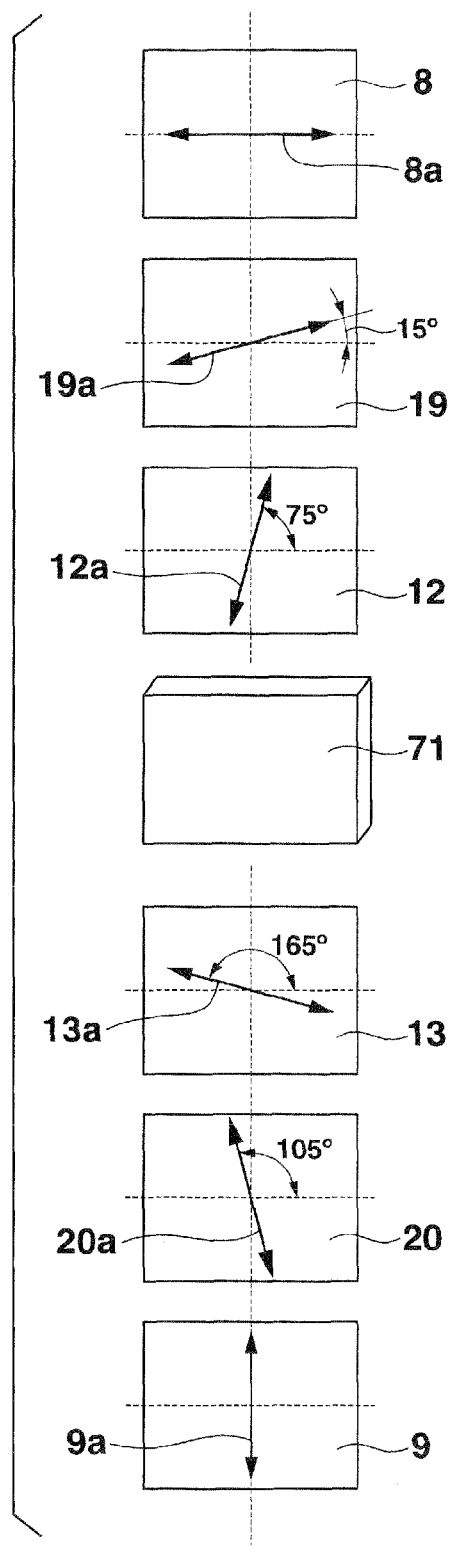
FIG. 10 is a view illustrating an arrangement of an optical axis of each optical element in the fifth embodiment.

As shown in FIGS. 9 and 10, the semi-transparent reflection type liquid crystal display device according to this embodiment is constituted of: a semi-transparent reflection type liquid crystal panel 71 including a reflection region and a transmission region in accordance with each pixel; a pair of polarizing plates 8 and 9 arranged to sandwich the pair of substrates 1 and 2 of the liquid crystal panel 71 on respective outer sides of these substrates; two first optical compensation layers 12 and 13 arranged respectively between the paired 71 and the pair of polarizing plates 8 and 9 on both sides of the liquid crystal panel 71; other optical compensation layers (retardation plates 19 and 20) arranged respectively between these first optical compensation layers 12 and 13 and the polarizing plates 8 and 9. Since a configuration of this liquid crystal display device according to the fifth embodiment is the same as that in the first one except that the liquid crystal panel is the semi-transparent reflection type liquid crystal panel 71 and the retardation plates 19 and 20 are arranged respectively between the first optical compensation layers 12 and 13 and the polarizing plates 8 and 9, like reference numerals denote like members, thereby eliminating their explanation.

The reflection transparent type liquid crystal panel 71 is constituted of the pair of substrates 1 and 2, each pixel electrode 3 and an opposed electrode 4 formed on inner surfaces of the substrates facing each other, aligning films 5 and 6 formed on surfaces of these electrodes 3 and 4, and a liquid crystal layer 7 interposed between the pair of substrates 1 and 2. An active element 3a which supplies a drive voltage is electrically connected with the pixel electrode 3, one pixel is formed of a region where each pixel electrode faces the opposed electrode 4, and a gap adjustment film 31 made of a transparent insulating film and a reflection film 32 provided on an entire inner top surface of the gap adjustment film 31 are formed at a part of each pixel.

The pixel electrode 3 is formed to cover an inner surface of the substrate 2, the reflection film 32 on the gap adjustment film 31 and a side surface of the film 31, a part of the transparent electrode covering the substrate surface in the pixel region facing the opposed electrode 4 forms a transmission display region, and a part of the transparent electrode which covers the reflection film 32 forms a reflection display region. That is, one pixel region is constituted of the reflection display region where the reflection film faces the first electrode and the transmission display region other than this reflection region. The reflection display region has a gap between the substrates facing each other being set narrow by the gap adjustment film 31, and it is set to approximately half of a substrate gap of the transmission display region. In the liquid crystal layer 7, a product of a birefringence Δn and a gap d of the transmission display region is substantially λ/2, i.e., a value of Δnd is set to, e.g., 350 nm in a range of 250 to 450 nm.

Further, a value of Δnd of the reflection display region is substantially λ/4, i.e., a value of Δnd is set to, e.g., 175 nm in a range of 75 to 275 nm.

The optical compensation layers 12 and 13 which are set in such a manner that values of refractive indices Nx, Ny and Nz have a relationship of Nx>Ny>Nz, a value of an in-plane retardation R represented as (Nx−Ny)d falls within a range of 120 to 160 nm and a value of a retardation Rz in a Z direction represented as {(Nx+Ny)/2−Nz} falls within a range of 50 nm to 300 nm are arranged on outer sides of the pair of substrates 1 and 2 of the liquid crystal panel 71. Furthermore, the pair of polarizing plates 8 and 9 are arranged on outer sides of the optical compensation plates 12 and 13.

In the fifth embodiment, the other optical compensation layers (which will be referred to as retardation plates 19 and 20 hereinafter) formed by retardation plates which are set in such a manner that values of refractive indices Nx, Ny and Nz have a relationship of Nx>Ny≈Nz and a value of an in-plane retardation R represented as (Nx−Ny)×d falls within a range of 240 to 300 nm are further arranged between the two optical compensation layers 12 and 13 and the pair of polarizing plates 8 and 9.

Further, respective optical axes of the first optical compensation layers 12 and 13 arranged on both sides of the liquid crystal panel 71, the retardation plates 19 and 20 arranged on outer sides of the first optical compensation layers 12 and 13 and the pair of polarizing plates 8 and 9 arranged with these members therebetween are arranged as follows with a horizontal direction when observing the liquid crystal display device being determined as a reference, as shown in FIG. 10. A transmission axis 9a of the polarizing plate 9 on the rear side opposite to the observation side which is positioned on a lower side in the drawing is arranged to face a direction of 90°, i.e., a vertical direction, and a phase delaying axis 20a of the retardation plate 20 on the rear side of the observation side is arranged to face a direction of 105°. An in-plane phase delaying axis 13a of the first optical compensation layer 13 on the rear side of the observation side is arranged to face a direction of 165°. An in-plane phase delaying axis 12a of the first optical compensation layer 12 on the observation side positioned on the observation side with the liquid crystal pane 71 at the center is arranged to face a direction of 75°. Moreover, a phase delaying axis 19a of the retardation plate 19 on the observation side is arranged to face a direction of 15°. Additionally, a transmission axis 8a of the polarizing plate 8 closest to the observation side is arranged to face a direction of 0°, i.e., a horizontal direction.

That is, the pair of polarizing plates 8 and 9 are arranged in such a manner that their transmission axes 8a and 9a become perpendicular to each other. The two retardation plates 19 and 20 are arranged in such a manner that their phase delaying axes 19a and 20a become perpendicular to each other and respectively cross the transmission axes 8a and 9a of the polarizing plates 8 and 9 adjacent thereto at 15°. The two first optical compensation layers 12 and 13 are arranged in such a manner that their in-plane phase delaying axes 12a and 13a become perpendicular to each other and respectively cross the phase delaying axes 19a and 20a of the retardation plates 19 and 20 adjacent thereto at 60°. Additionally, the first optical compensation layer 13 and the retardation plate 20 arranged on the opposite side of the observation side of the liquid crystal panel 71 function as a broadband λ/4 plate whose phase delaying axis is substantially arranged to face a direction of 135° with respect to light transmitted in a normal line direction of the liquid crystal panel 71, and the first optical compensation layer 12 and the retardation plate 19 arranged on the observation side of the liquid crystal panel 71 function as a broadband λ/4 plate whose phase delaying axis is arranged to face a direction of 45° with respect to light transmitted in the normal line direction of the liquid crystal panel 71.

In this liquid crystal display device according to the fifth embodiment, transmission display is carried out as follows with respect to light which enters in the normal line direction of this liquid crystal display device.

In a state of no voltage application where a voltage is not applied between each pixel electrode 3 and the opposed electrode 4 facing each other, linear polarized light transmitted through the polarizing plate 9 on the rear side is converted into circular polarized light which rotates in one direction by the retardation plate 20 and the first optical compensation layer 13 on the rear side to enter the liquid crystal panel. The light which has entered from the rear side of the liquid crystal panel 75 is transmitted through a transmission display region of each pixel of the liquid crystal panel 71. At this time, liquid crystal molecules 7a in the liquid crystal layer 7 are in a vertically standing alignment state, and there is no retardation. Therefore, the circular polarized light is transmitted through the liquid crystal panel 71 as it is to enter the first optical compensation layer 12 and the retardation plate 19 on the observation side. The optical axes 12a and 19a of the first optical compensation layer 12 and the retardation plate 19 on the observation side are arranged to be perpendicular to the optical axes 13a and 20a of the first optical compensation plate 13 and the retardation plate 20 on the rear side. Thus, the circular polarized light which has entered the first optical compensation layer 12 and the retardation plate 19 on the observation side is converted into linear polarized light having a polarization plane parallel to a polarization plane of the linear polarized light which has entered the retardation plate 20 on the rear si de. Since the linear polarized light which enters the polarizing plate 8 on the observation side is linear polarized light having a polarization plane parallel to an absorption axis thereof, this light is absorbed, thereby providing black (dark) display.

In a voltage applied state where a sufficiently high voltage is applied between each pixel electrode 3 and the opposed electrode 4 facing each other, so that the liquid crystal molecules 7a are aligned in substantially parallel to the substrate surfaces, linear polarized light transmitted through the polarizing plate 9 on the rear side is converted into circular polarized light rotating in one direction by the retardation plate 20 and the first optical compensation layer 13 on the rear side to enter the liquid crystal panel 71. The light which has entered from the rear side of the liquid crystal panel 71 is transmitted through the transmission display region of each pixel of the liquid crystal panel 71. At this time, the liquid crystal layer 7 in the transmission display region has a retardation (retardation) of ½ since the liquid crystal molecules 7a are aligned in parallel to the main planes of the substrates. Therefore, the incident circular polarized light is converted into circular polarized light rotating in a reverse direction to exit from the liquid crystal panel 71, and enters the first optical compensation layer 12 and the retardation plate 19 on the observation side. The optical axes 12a and 19a of the first optical compensation layer 12 and the retardation plate 19 on the observation side are respectively arranged to be perpendicular to the optical axes 12a and 19a of the first optical compensation layer 13 and the retardation plate 20 on the rear side. Therefore, the circular polarized light which has entered the first optical compensation layer 12 and the retardation plate 20 on the observation side is converted into linear polarized light having a polarization plane perpendicular to a polarization plane of the linear polarized light which has entered the retardation plate 20 on the rear side, and enters the polarizing plate 8 on the observation side. Since the linear polarized light which enters the polarizing plate 8 on the observation side is linear polarized light having a polarization plane parallel to the transmission axis of this plate, thereby providing white (bright) display.

In this liquid crystal display device according to the fifth embodiment, reflection display which reflects light which enters from the observation side along the normal line direction of this liquid crystal display device by the liquid crystal panel 71 and observes this reflected light is carried out as follows.

In a state of no voltage application where a voltage is not applied between each pixel electrode 3 and the opposed electrode 4 facing each other, linear polarized light transmitted through the polarizing plate 8 on the observation side is converted into circular polarized light which rotates in one direction by the retardation plate 19 and the first optical compensation layer 12 on the observation side to enter the liquid crystal panel 71. At this time, the liquid crystal molecules 7a of the liquid crystal layer 7 are in a vertically standing alignment state, and there is no retardation. Therefore, the circular polarized light which has entered the reflection display region of each pixel of this liquid crystal panel from the observation side of the liquid crystal panel 71 is transmitted through the liquid crystal layer 7 as the circular polarized light, reflected by the reflection film 32 of each pixel to be again converted into circular polarized light rotating in a reverse direction. It again returns to the liquid crystal layer 7, and enters the first optical compensation layer 12 and the retardation plate 19 on the observation side. The optical axes 12a and 19a of the first optical compensation layer 12 and the retardation plate 19 on the observation side are respectively arranged to be perpendicular to the optical axes 13a and 20a of the first optical compensation layer 13 and the retardation plate 20 on the rear side. Therefore, the circular polarized light which has entered the first optical compensation layer 12 and the retardation plate 19 on the observation side is converted into linear polarized light having a polarization plane parallel to the absorption axis of the polarizing plate 8 on the observation side to enter the polarizing plate 8 where this light is absorbed, thereby providing black (dark) display.

In a voltage applied state where a sufficiently high voltage is applied between each pixel electrode 3 and the opposed electrode 4 facing each other and the liquid crystal molecules 7a are aligned in substantially parallel to the substrate mains planes, linear polarized light transmitted through the polarizing plate 8 on the observation side is converted into circular polarized light rotating in one direction by the retardation plate 19 and the first optical compensation layer 12 on the observation side to enter the liquid crystal panel 71. At this time, the liquid crystal molecules 7a in the liquid crystal layer 7 are substantially horizontally aligned with respect to the substrate main planes and there is a retardation of λ/4. Therefore, the circular polarized light which has entered the reflection display region of each pixel of the liquid crystal panel 71 from the observation side is converted into linear polarized light having a polarization plane parallel to a polarization plane of the linear polarized light transmitted through the polarizing plate 8 on the observation side when it has reached the reflection film 32 of each pixel after transmission through the liquid crystal layer 7. This light is reflected by the reflection film 32 to return to the liquid crystal layer 7, and a retardation of λ/4 is again given in this returning process. This linear polarized light is converted into circular polarized light rotating in the same direction as the circular polarized light rotating in the one direction to exit from the liquid crystal layer 7, and enters the optical compensation layer 12 and the retardation plate 19 on the observation side. The circular polarized light which has entered the first optical compensation layer 12 and the retardation plate 19 on the observation side is converted into linear polarized light having a polarization plane parallel to the transmission axis 8a of the polarizing plate 8 on the observation side, and transmitted through the polarizing plate 8 on the observation side, thereby providing white display (bright).

Furthermore, the retardation of each of the first optical compensation layers 12 and 13 is changed to increase in accordance with an inclination angle of light which enters from an obliquely inclined direction with respect to the normal line of the liquid crystal display device. Therefore, a change in retardation due to oblique incidence of light with respect to the liquid crystal layer 7 can be compensated by a change in retardation of each of the first optical compensation layers 12 and 13, thereby expanding a viewing angle range.

Figure 11:
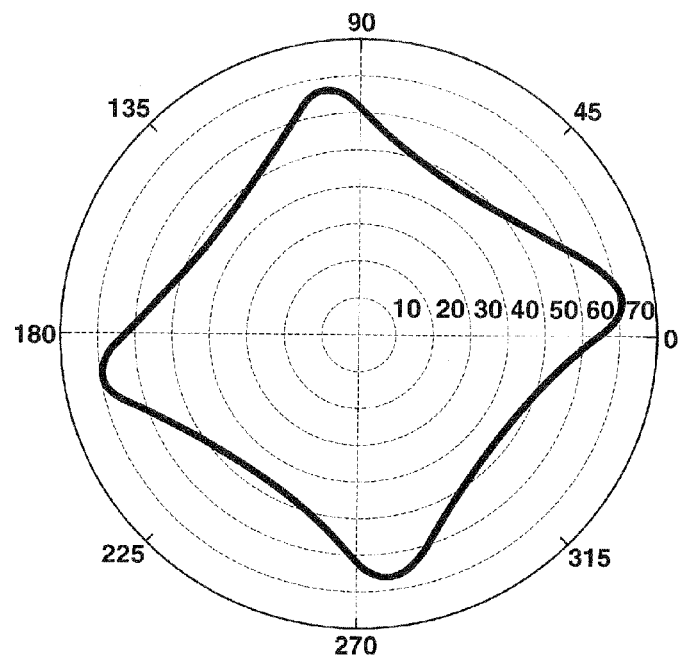
FIG. 11 is a viewing angle characteristic view showing a contrast distribution with respect to a viewing angle in the liquid crystal display device according to the fifth embodiment.

FIG. 11 shows a contrast distribution with respect to an angle (a viewing angle) in the observation direction to the substrate normal line direction in the semi-transparent reflection type liquid crystal display device according to the fifth embodiment. As shown in this figure, in case of the liquid crystal display device according to this embodiment where the first optical compensation layers 12 and 13 and the retardation plate 19 and 20 are provided, a region where contrast is not smaller than 10 is expanded to a range of substantially 135° in vertical and horizontal directions as indicated by a solid line.

As described above, in the fifth embodiment, the first optical compensation layers 12 and 13 each having the in-plane retardation of substantially λ/4 and the retardation plates 19 and 20 each having the retardation of λ/2 are arranged on both sides of the semi-transparent reflection type liquid crystal panel 17, and these first optical compensation layers 12 and 13 and retardation plates 19 and 20 provide a function of the broadband λ/4 retardation plate. As a result, a transmission factor can be increased, and coloring of reflected light can be prevented. Furthermore, the retardation Rz in the Z direction of the optical compensation layers can improve viewing angle characteristics.

Embodiment 6

The description has been given as to the liquid crystal display device in which paired first optical compensation layers 12 and 13 and paired retardation plates 19 and 20 are arranged on the observation side and the opposite side of the liquid crystal panel in the fifth embodiment. However, the object of the present invention can be likewise achieved when other second optical compensation plates 22 and 23 are additionally arranged respectively on outer sides of the first optical compensation layers 12 and 13 and the retardation plates 19 and 20 arranged on both sides of the liquid crystal panel 71. When the other second optical compensation layers 22 and 23 are further arranged on both sides of the liquid crystal panel 71 in this manner, a value of a retardation Rz in a Z direction can be sufficiently increased, and viewing angle dependence of contrast can be satisfactorily compensated. Since a configuration of this liquid crystal display device according to the sixth embodiment is the same as that in the fifth one except that the other second optical compensation layers 22 and 23 are additionally arranged respectively on both sides of the liquid crystal panel 71 in the liquid crystal display device shown in FIGS. 9 and 10, like reference numerals denote like members, thereby eliminating their explanation.

Figure 12:
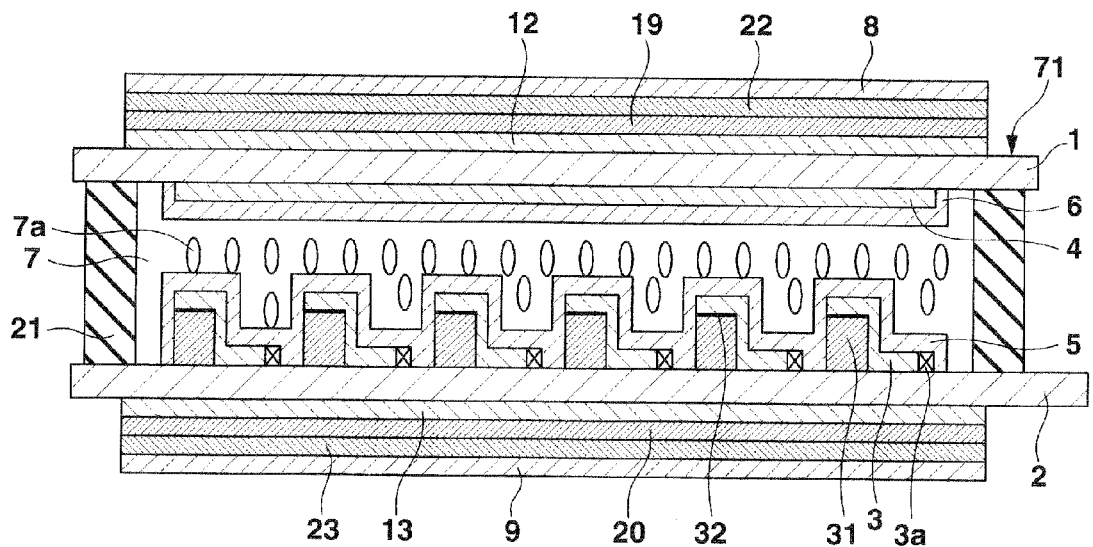
FIG. 12 is a view showing a configuration of a liquid crystal display device according to a sixth embodiment of the present invention.
Figure 13:
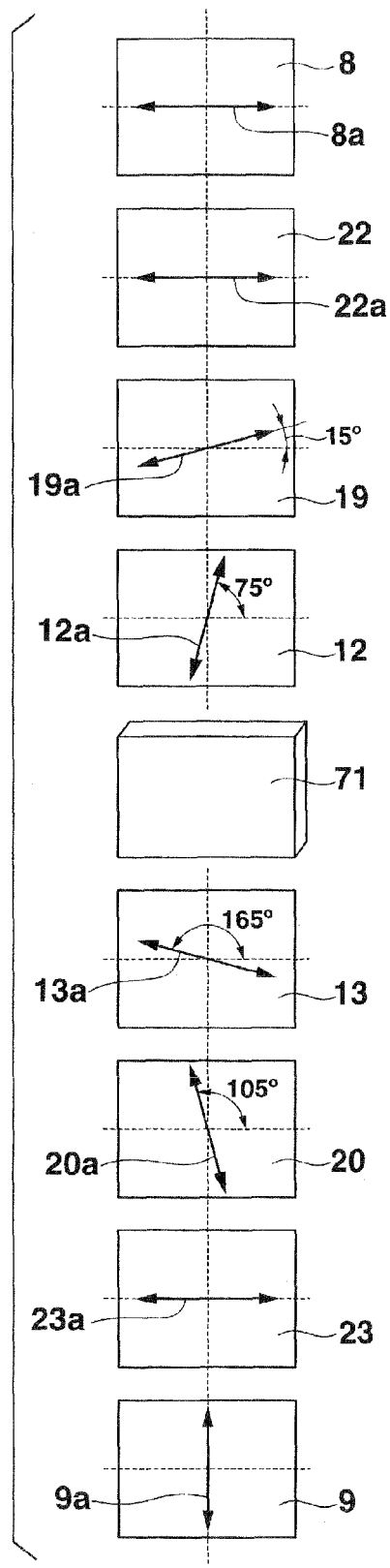
FIG. 13 is a view showing a configuration of a liquid crystal display device according to the sixth embodiment of the present invention.

As shown in FIGS. 12 and 13, the liquid crystal display device according to this embodiment is provided with: a liquid crystal panel 71; a first optical compensation layer 12 arranged on an observation side of this liquid crystal panel 71; a retardation plate 19 arranged on the observation side; and a second optical compensation layer 22 arranged between the retardation plate 19 and a polarizing plate 8 provided on an outer side of the retardation plate 19. Moreover, it includes: a first optical compensation layer 13 on a rear side opposite to the observation side of the liquid crystal panel 71; a retardation plate 20 arranged on the rear side; and a second optical compensation layer 23 arranged between the retardation plate 20 and a polarizing plate 9 provided on the rear side of the retardation plate 20.

The second optical compensation layers 22 and 23 are formed by optical compensation plates set in such a manner that values of refractive indices Nx, Ny and Nz have a relationship of Nx>Ny>Nz, a value of an in-plane retardation P represented as (Nx−Ny)d falls within a range of 120 to 160 nm and a value of a retardation Rz in a Z direction falls within a range of 50 to 300 nm. They may or may not have an in-plane retardation R, and its value is an arbitrary value.

That is, as shown in FIG. 13, the first optical compensation plate 12 on the observation side which is the same as that in Embodiment 5 is arranged on the observation side of the liquid crystal panel 71 in such a manner that its in-plane phase delaying axis 12a faces a direction of 75° with respect to a horizontal direction when observing the liquid crystal display device. The retardation plate 19 is arranged on the observation side in such a manner that its phase delaying axis 19a faces a direction of 15° with respect to the horizontal direction. The polarizing plate 8 closest to the observation side is arranged in such a manner that its transmission axis 8a becomes parallel to the horizontal direction. Additionally, the second optical compensation layer 22 is arranged between the retardation plate 19 on the observation side and the polarizing plate 8 on the observation side in such a manner that its in-plane phase delaying axis 22a becomes parallel to the transmission axis 8a of the polarizing plate 8 on the observation side. That is, the two first optical compensation layers are arranged in such a manner that their in-plane phase delaying axes become perpendicular to each other and respectively cross the transmission axes of the polarizing plates adjacent thereto in a range of 5° to 25° or 65° to 85°.

The first optical compensation layer 13 on the rear side which is the same as that in the fifth embodiment is arranged on the opposite side of the observation side of the liquid crystal panel 71 in such a manner that its in-plane optical axis 13a faces a direction of 165° with respect to the horizontal direction. The retardation plate 20 is arranged on the rear side in such a manner that its in-plane phase delaying axis 20a faces a direction of 105° with respect to the horizontal direction of the liquid crystal display device. The polarizing plate 9 on the rearmost side is arranged in such a manner that its transmission axis 9a becomes perpendicular to the horizontal direction. Further, the second optical compensation layer 23 on the rear side is arranged between the retardation plate 20 on the rear side and the polarizing plate 9 on the rear side in such a manner that its in-plane phase delaying axis 23a becomes perpendicular to the transmission axis 9a of the polarizing plate 9 on the rear side.

As described above, the second optical compensation layers 22 and 23 are arranged in such a manner that their in-plane phase delaying axes 22a and 23a become parallel to or perpendicular to the transmission axes 8a and 9a of the polarizing plates 8 and 9 adjacent thereto. According to the arrangement of these optical axes, there is no optical function with respect to linear polarized light having a polarization plane parallel to the transmission axes 8a and 9a or absorption axes of the respective polarizing plates 8 and 9. Therefore, an assembly of each of the first optical compensation layers 12 and 13, and each of the second optical compensation layers 22 and 23 arranged on both sides of the liquid crystal panel 71 function as one optical compensation layer or plate in which values of the retardations Rz in the Z direction are totalized.

Furthermore, according to this liquid crystal display device of the sixth embodiment, like the fifth one, in transmission display, in a state of no voltage application where a voltage is not applied between each pixel electrode 3 and an opposed electrode 4, linear polarized light transmitted through the polarizing plate 9 on the rear side is transmitted through the second optical compensation layer 23 on the rear side without undergoing an optical function to enter the retardation plate 20 and the first optical compensation layer 13. This light is converted into circular polarized light by this retardation plate 20 and the first optical compensation layer 13 to enter the liquid crystal layer 7 of the liquid crystal panel 71. The circular polarized light is transmitted through the liquid crystal layer 7 as it is, and again converted into the original linear polarized light by the first optical compensation layer 12 and the retardation plate 19 on the observation side. It is transmitted through the second optical compensation layer 22 without undergoing the optical function to be absorbed into the polarizing plate 8 on the observation side arranged in a crossed nichol state, thereby providing black (dark) display.

In a voltage applied state where a sufficiently high voltage is applied between each pixel electrode 3 and an opposed electrode 4, linear polarized light transmitted through the polarizing plate 9 on the rear side is transmitted through the second optical compensation layer 23 on the rear side without undergoing an optical function to enter the retardation plate 20 and the first optical compensation layer 13. This linear polarized light is converted into circular polarized light by these retardation plate 20 and first optical compensation plate 13 on the rear side to enter the liquid crystal layer 7 of the liquid crystal panel 71. The circular polarized light is converted into circular polarized light rotating in a reverse direction by the liquid crystal layer 7 aligned to have a retardation of $\lambda/2$. This light is converted into linear polarized light whose polarization plane is rotated 90° with respect to polarization plane of the linear polarized light transmitted through the polarizing plate 9 on the rear side by the first optical compensation layer 12 and the retardation plate 20 on the observation side, and enters the second optical compensation layer 22. This linear polarized light is transmitted through the second optical compensation layer 22 without undergoing an optical function, and further transmitted through the polarizing plate 8 on the observation side arranged in a crossed nichol state, thereby providing white (bright) display.

In reflection display, in a voltage non-applied state where a voltage is not applied between each pixel electrode 3 and the opposed electrode 4 facing each other, linear polarized light transmitted through the polarizing plate 8 on the observation side enters the retardation plate 19 on the observation side without undergoing the optical function by the second optical compensation layer 22 on the observation side. It is converted into circular polarized light rotating in one direction by the retardation plate 19 and the first optical compensation layer 12 to enter the liquid crystal panel 7. The circular polarized light which has entered the reflection display region of each pixel in the liquid crystal panel 7 from the observation side of the liquid crystal panel is transmitted through the layer 7 as it is. This circular polarized light is reflected by the reflection film 32 of each pixel to be converted into circular polarized light rotating in a reverse direction. It returns to the liquid crystal layer 7 to enter the first optical compensation layer 12 and the retardation plate 19 on the observation side. The circular polarized light which has entered the first optical compensation layer 12 and the retardation plate 19 on the observation side is converted into linear polarized light having a polarization plane parallel to an absorption axis on the observation side to enter the second optical compensation layer 22 on the observation side and the polarizing plate 8 on the observation side where this light is absorbed, thereby providing black display (dark).

In a voltage applied state where a sufficiently high voltage is applied between each pixel electrode 3 and the opposed electrode 4 facing each other, linear polarized light transmitted through the polarizing plate 8 on the observation side enters the retardation plate 19 on the observation side without undergoing the optical function by the second optical compensation layer 22 on the observation side. This light is converted into circular polarized light rotating in one direction by the retardation plate 19 and the first optical compensation layer 12 on the observation side to enter the liquid crystal panel 7. The circular polarized light which has entered the reflection display region of each pixel in the liquid crystal panel 7 from the observation side is converted into linear polarized light having a polarization plane parallel to a polarization plane of the linear polarized light transmitted through the polarizing plate 8 on the observation side. This linear polarized light is reflected by the reflection film 32 to return to the liquid crystal layer 7. It is then converted into circular polarized light rotating in the same direction as the circular polarized light rotating in the one direction mentioned above to exit from the liquid crystal layer 7. This light enters the first optical compensation layer 12 and the retardation plate 19 on the observation side. The circular polarized light which has entered the first optical compensation layer 12 and the retardation plate 19 on the observation side is converted into linear polarized light having a polarization plane parallel to the transmission axis on the observation side to enter the second optical compensation layer 22 on the observation side. It is then transmitted through the polarizing plate 8 on the observation side without undergoing the optical function by the second optical compensation layer 22 on the observation side, thereby providing white display (bright).

Additionally, retardations of the first optical compensation layers 12 and 13 and the second optical compensation layers 22 and 23 are changed to increase in accordance with an inclination angle of light which enters from an obliquely inclined direction with respect to the normal line of the liquid crystal display device. Therefore, a change in retardation generated due to oblique incidence of light with respect to the liquid crystal layer 7 can be compensated by changes in retardations of these first and second optical compensation layers 12, 13, 22 and 23, thereby expanding a viewing angle range.

As described above, according to the sixth embodiment, when the first optical compensation layers 12 and 13 and the second optical compensation layers 22 and 23 are arranged on both sides of the liquid crystal panel 7, a value of the retardation Rz in the Z direction can be sufficiently increased, thus satisfactorily compensating viewing angle dependence of contrast.

Figure 14:
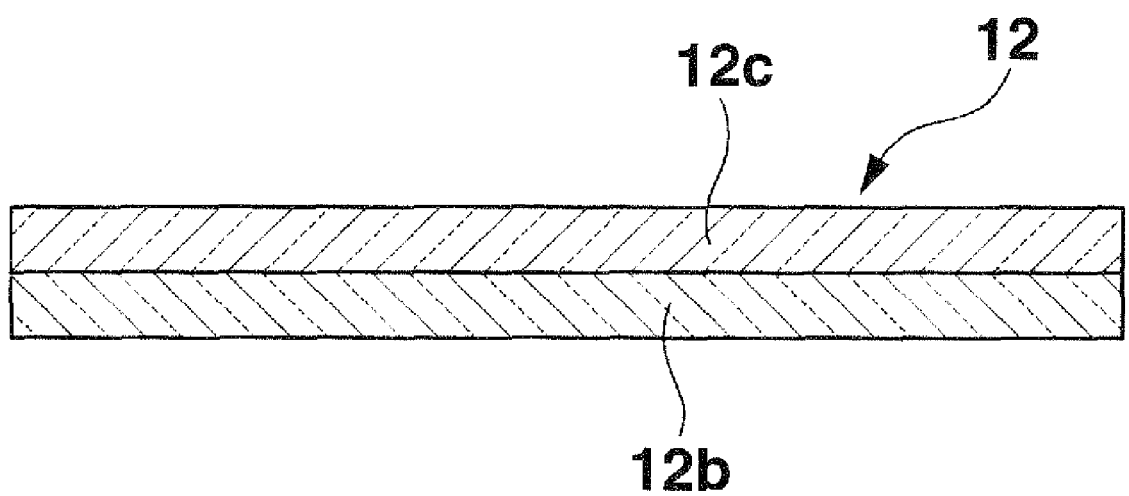
FIG. 14 is a view showing a configuration of a modification of an optical compensation plate.

It is to be noted that the present invention is not restricted to the examples described in conjunction with the foregoing embodiments, and various modifications and applications can be carried out. For example, the optical compensation layer or plate formed by the biaxial retardation plate set in such a manner that a relationship of Nx>Ny>Nz is provided, a value of the in-plane retardation R represented as (Nx−Ny)d falls within a range of 120 to 160 nm and a value of the retardation Rz in the Z direction represented as {(Nx+Ny)/2−Nz} falls within a range of 50 to 300 nm is used as each of the first and second optical compensation layers. However, the present invention is not restricted thereto, and it is possible to configure one optical compensation layer by combining a uniaxial retardation plate in which a value of a retardation falls within a range of 120 to 160 nm with a retardation plate in which a value of a retardation Rz in a Z direction falls within a range of 50 to 300 nm. That is, as shown in FIG. 14, one optical compensation layer or plate having the above-described characteristics may be provided by superimposing a ¼ retardation plate 12c and a retardation plate 12b arranged in such a manner that a refractive index in a normal line direction of main surfaces of substrates becomes smaller than a refractive index in a direction parallel to the ma n surfaces of the substrates.

Moreover, in the foregoing embodiments, the protrusion is formed on the aligning film on the opposed substrate side in order to align a part of the aligning film toward the center of the pixel in a radial pattern, but this radial alignment forming technique itself is arbitrary. For example, a concave or depress portion may be formed on the lower pixel electrode substrate side, or a slit may be formed in the pixel electrode to divide one pixel into a plurality of alignment regions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display device comprising:
    a first substrate having one surface on which a first electrode is provided;
    a second substrate which is arranged to face the first substrate, and is provided with a second electrode which forms a pixel region in accordance with a region facing the first electrode on one surface facing the first substrate;
    homeotropic aligning films formed on mutually faced surfaces of the first electrode and the second electrode, respectively;
    a liquid crystal layer which is interposed between the first and second substrates and has a negative dielectric anisotropy;
    a pair of polarizing plates each arranged on an exterior surface opposite to the respective mutually faced surfaces of the first and second substrates;
    a first optical compensation plate which is provided on one side between the substrates and the polarizing plates, the first optical compensation plate being set in such a manner that values of Nx, Ny and Nz have a relationship of Nx>Ny>Nz and an in-plane retardation in a plane parallel to a main surface of the substrate has a value which is substantially ¼ of a wavelength λ of visible light, where Nx is a refractive index in a first axial direction parallel to the main surface of each of the pair of substrates, Ny is a refractive index in a second axial direction which is parallel to the main surfaces of the substrates and vertical to the first axial direction, and Nz is a refractive index in a third axial direction vertical to the main surfaces of the substrates; and
    a second optical compensation plate which is provided on the other side between the substrates and the polarizing plates, in which an in-plane retardation in a plane parallel to the main surface of the substrate has a value which is substantially ¼ of a wavelength λ of visible light.

2. The liquid crystal display device according to claim 1, wherein the second optical compensation plate is a uniaxial retardation plate which is set in such a manner that values of Ny and Nz are substantially equal, and a value of Nx is greater than the value of Ny, where Nx is a refractive index in a first axial direction parallel to the main surface of each of the pair of substrates, Ny is a refractive index in a second axial direction which is parallel to the main surfaces of the substrates and vertical to the first axial direction, and Nz is a refractive index in a third axial direction vertical to the main surfaces of the substrates.

3. The liquid crystal display device according to claim 2, wherein the uniaxial retardation plate has a value R, which is the in-plane retardation in a plane parallel to the main surface of the substrate, falling within a range of 120 nm to 160 nm.

4. The liquid crystal display device according to claim 2, wherein:
    the first optical compensation plate and the uniaxial retardation plate are arranged in such a manner that their in-plane phase delaying axes in directions along which a refractive index is maximum or their in-plane phase advancing axes in directions along which the refractive index is minimum in a plane parallel to the main surfaces of the substrates become perpendicular to each other, and
    the pair of polarizing plates have their optical axes perpendicular to each other, and are arranged to face directions by which the optical axes of the respective polarizing plates cross the in-plane phase delaying axes or the in-plane phase advancing axes of the adjacent first and second optical compensation plates at 35° to 55°.

5. The liquid crystal display device according to claim 2, wherein each one of biaxial retardation plates is further provided between the first and second optical compensation plates and the pair of polarizing plates provided on the outer sides of the optical compensation plates, respectively, the biaxial retardation plate having values of Nx, Ny, and Nz satisfying the relationship Nx>Ny>Nz.

6. The liquid crystal display device according to claim 5, wherein:
    the pair of polarizing plates have their optical axes perpendicular to each other,
    the first and second optical compensation plates, which are disposed on the respective outer sides of the pair of substrates, are arranged in such a manner that their in-plane phase delaying axes in directions along which a refractive index is maximum or their in-plane phase advancing axes in directions along which the refractive index is minimum in a plane parallel to the main surfaces of the substrates become perpendicular to each other, and arranged in such directions as to cross the optical axes of the polarizing plates adjacent thereto in a range of 35° to 55°, and
    the two biaxial retardation plates, which are disposed on the outer sides of the first and second optical compensation plates, respectively, are arranged in such a manner that their in-plane phase delaying axes in directions along which a refractive index is maximum or their in-plane phase advancing axes in directions along which the refractive index is minimum in a plane parallel to the main surface of each of the substrates become parallel to or perpendicular to each other, and become parallel to or perpendicular to the optical axes of the polarizing plates adjacent thereto.

7. The liquid crystal display device according to claim 1, wherein the second optical compensation plate is a biaxial retardation plate which is set in such a manner that values of Nx, Ny, and Nz have the relationship Nx>Ny>Nz, where Nx is a refractive index in a first axial direction parallel to the main surface of each of the pair of substrates, Ny is a refractive index in a second axial direction which is parallel to the main surfaces of the substrates and vertical to the first axial direction, and Nz is a refractive index in a third axial direction vertical to the main surfaces of the substrates.

8. The liquid crystal display device according to claim 1, wherein the first and second optical compensation plates each comprise a biaxial retardation plate set in such a manner that values of Nx, Ny and Nz have a relationship of Nx>Ny>Nz, a value of an in-plane retardation R represented as (Nx−Ny)d falls within a range of 120 nm to 160 nm and a value of a retardation Rz in a Z direction represented as {(Nx+Ny)/2−Nz} falls within a range of 50 to 300 nm, where Nx is a refractive index in a first axial direction parallel to the main surfaces of the pair of substrates, Ny is a refractive index in a second axial direction parallel to the main surfaces of the substrates and vertical to the first axial direction, Nz is a refractive index in a third axial direction vertical to main surfaces of the substrates, and d is the thickness of each of the first and second optical compensation plates.

9. The liquid crystal display device according to claim 8, wherein:
the first and second optical compensation plates, which are disposed on the respective outer sides of the pair of substrates, are arranged in such a manner that their in-plane phase delaying axes in directions along which a refractive index is maximum or their in-plane phase advancing axes in directions along which the refractive index is minimum in a plane parallel to the main surfaces of the substrates become perpendicular to each other, and
the pair of polarizing plates have their optical axes perpendicular to each other, and are arranged to face directions by which a polarization axis of one of the polarizing plates crosses the in-plane phase delaying axes or the in-plane phase advancing axes of the adjacent first and second optical compensation plates at 35° to 55°.

10. The liquid crystal display device according to claim 8, further comprising each one of uniaxial retardation plates arranged respectively between the first and second optical compensation plates and the polarizing plates provided on the outer sides of the optical compensation plates and set in such a manner that values of Nx, Ny and Nz have a relationship of Nx>Ny=Nz and a retardation R in a plane parallel to the main surface of each of the substrates has a value falling within a range of 240 to 300 nm.

11. The liquid crystal display device according to claim 10, wherein:
the pair of polarizing plates have their optical axes perpendicular to each other,
the first and second optical compensation plates, which are disposed on the respective outer sides of the pair of substrates, are arranged so that their in-plane phase delaying axes in directions along which a refractive index is maximum or their in-plane phase advancing axes in directions along which the refractive index is minimum in a plane parallel to the main surface of each of the substrates become perpendicular to each other, and the first and second optical compensation plates are arranged in such directions as to cross the optical axes of the polarizing plates adjacent thereto in a range of 5° to 25° or 65° to 85°, and
the two uniaxial retardation plates, each of which is provided respectively between the first and second optical compensation plates and the polarizing plates provided on the outer sides of the optical compensation plates, are arranged so that their phase delaying axes in directions along which a refractive index is maximum or their phase advancing axes along which the refractive index is minimum in a plane parallel to the main surface of each of the substrates become perpendicular to each other, are arranged in such directions as to cross the in-plane phase delaying axes or in-plane phase advancing axes of the first and second optical compensation plates adjacent thereto in a range of 50° to 70°.

12. The liquid crystal display device according to claim 10, further comprising a reflection film corresponding to a part of one of the first electrode and the second electrode, wherein in a pixel region formed by a region where the electrodes face each other, a transmission display region which controls light transmitted through the pair of substrates facing each other, and a reflection display region which controls light reflected by the reflection film are formed.

13. The liquid crystal display device according to claim 10, further comprising biaxial retardation plates, each of which is provided respectively between the uniaxial retardation plates disposed on the outer sides of the first and second optical compensation plates and the pair of polarizing plates, and set in such a manner that values of Nx, Ny and Nz have a relationship Nx>Ny>Nz and a value of a retardation Rz in a Z direction represented as {(Nx+Ny)/2−Nz} falls within a range of 50 to 300 nm.

14. The liquid crystal display device according to claim 13, wherein:
the pair of polarizing plates have their optical axes perpendicular to each other,
the biaxial retardation plates which are disposed on the outer sides of the uniaxial retardation plates are arranged such that their in-plane phase delaying axes or in-plane phase advancing axes become parallel to or perpendicular to each other and become parallel to or perpendicular to the optical axes of the polarizing plates adjacent thereto,
the first and second optical compensation plates, which are disposed via the pair of substrates, are arranged so that their in-plane phase delaying axes in directions along which a refractive index is maximum or their in-plane phase advancing axes in directions along which a refractive index is maximum or their in-plane phase advancing axes in directions along which the refractive index is minimum in a plane parallel to the main surface of each of the substrates become perpendicular to each other, and the first and second optical compensation plates are arranged in such directions as to cross the optical axes of the polarizing plates adjacent thereto in a range of 5° to 25° or 65° to 85°, and
the two uniaxial retardation plates, each of which is provided on the respective outer sides of the first and second optical compensation plates, are arranged so that their phase delaying axes in directions along which a refractive index is maximum or their phase advancing axes along which the refractive index is minimum in a plane parallel to the main surface of each of the substrates become perpendicular to each other, are arranged in such directions as to cross the in-plane phase delaying axes or in-plane phase advancing axes of the first and second optical compensation plates adjacent thereto in a range of 50° to 70°.

15. The liquid crystal display device according to claim 8, further comprising biaxial retardation plates, each of which is provided respectively between the first and second optical compensation plates and the pair of polarizing plates, and set in such a manner that values of Nx, Ny and Nz have a relationship Nx>Ny>Nz and a value of a retardation Rz in a z direction represented as {(Nx+Ny)/2−Nz} falls within a range of 50 to 300 nm.

16. The liquid crystal display device according to claim 15, wherein:
the pair of polarizing plates have their optical axes perpendicular to each other, the first and second optical compensation plates, which are disposed on the respective outer sides of the pair of substrates, are arranged in such a manner that their in-plane phase delaying axes in directions along which a refractive index is maximum or their in-plane phase advancing axes in directions along which the refractive index is minimum in a plane parallel to the main surfaces of the substrates become perpendicular to each other, and arranged in such directions as to cross the optical axes of the polarizing plates adjacent thereto in a range of 35° to 55°, and
the two biaxial retardation plates, which are disposed on the outer sides of the first and second optical compensation plates, respectively, are arranged in such a manner that their in-plane phase delaying axes in directions along which a refractive index is maximum or their in-plane phase advancing axes in directions along which the refractive index is minimum in a plane parallel to the main surface of each of the substrates become parallel to or perpendicular to each other, and become parallel to or perpendicular to the optical axes of the polarizing plates adjacent thereto.

17. The liquid crystal display device according to claim 1, further comprising means for aligning a liquid crystal constituting the liquid crystal layer in such a manner that directors face a plurality of directions by application of the electric field.

18. A liquid crystal display device comprising:
a first substrate having a transparent first electrode provided thereon;
a second substrate which is arranged to face the first substrate, and is provided with a transparent second electrode which forms a pixel region, where transmission type display is performed, in accordance with a region facing the first electrode on a surface facing the first substrate;
homeotropic aligning films formed on mutually faced surfaces of the first electrode and the second electrode, respectively;
a liquid crystal layer which is interposed between the substrates and has a negative dielectric anisotropy;
a pair of polarizing plates, each of the polarizing plates being arranged on the respective exterior surfaces opposite to the mutually faced surfaces of the first and second electrodes;
first and second biaxial retardation plates which are respectively arranged between the pair of substrates and the pair of polarizing plates and set in such a manner that values of Nx, Ny and Nz have a relationship Nx>Ny>Nz and a retardation having a value which is ¼ of a wavelength λ is given to transmitted light, where Nx is a refractive index in a first axial direction parallel to a main surface of each of the pair of substrates, Ny is a refractive index in a second axial direction parallel to the main surface of each of the substrates and vertical to the first axial direction, and Nz is a refractive index in a third axial direction vertical to the main surface of each of the substrates; and
third and fourth biaxial retardation plates which are arranged respectively between the first and second biaxial retardation plates and the polarizing plates provided on the outer sides of each of the biaxial retardation plates, and arranged in such a manner that values of Nx, Ny and Nz have a relationship Nx>Ny>Nz and directions of their in-plane phase delaying axes along which a refractive index is maximum in a plane parallel to the main surface of each of the substrates become perpendicular to or parallel to transmission axes of the polarizing plates adjacent thereto.

19. The liquid crystal display device according to claim 18, wherein:
the pair of polarizing plates have their optical axes perpendicular to each other, and
the first and second biaxial retardation plates are arranged in such a manner that their in-plane retardations in a plane parallel to the main surface of each of the substrates have a value which is ¼ of a wavelength λ of visible light, and directions of their in-plane phase delaying axes along which a refractive index is maximum in a plane parallel to the main surface of each of the substrates form substantially 45° with the transmission axes of the polarizing plates adjacent thereto.

20. A liquid crystal display device comprising:
a first substrate having a transparent first electrode provided thereon;
a reflection film which is provided on a surface facing said first substrate and faces a part of the first electrode;
a second substrate which is arranged in a region including the reflection film and provided with a second electrode, the second electrode forming, in accordance with a region facing the first electrode, a pixel region constituting a reflection display region corresponding to the reflection film and a transmission display region other than the reflection display region;
a homeotropic aligning films formed on mutually faced surfaces of the first electrode and the second electrode, respectively;
a liquid crystal layer which gives a retardation which is substantially half of a wavelength of light transmitted through the transmission display region of the pixel region to the light, is interposed between the substrates in such a manner that a layer thickness corresponding to the reflection region of the pixel region has a layer thickness which is substantially half of a layer thickness corresponding to the transmission display region, and has a negative dielectric anisotropy;
a pair of polarizing plates each arranged on the respective exterior surfaces opposite to the mutually faced surfaces of the first and second substrates;
first and second biaxial retardation plates which are arranged respectively between the pair of substrates and the pair of polarizing plates, and set in such a manner that values of Nx, Ny and Nz have a relationship Nx Ny>Nz, where Nx is a refractive index in a first axial direction parallel to a main surface of each of the pair of substrates, Ny is a refractive index in a second axial direction parallel to the main surface of each of the substrates and vertical to the first axial direction, and Nz is a refractive index in a third axial direction vertical to main planes of the substrates; and first and second uniaxial retardation plates which are arranged respectively between the first and second biaxial retardation plates and the polarizing plates provided on the outer sides of each of the biaxial retardation plates, and arranged in such a manner that respective in-plane phase delaying axes of the adjacent first and second biaxial retardation plates along which a refractive index shows a maximum value in a plane parallel to the main surface of each of the substrates face a direction of substantially 45°, values of Nx, Ny and Nz have a relationship Nx>Ny=Nz, and a value obtained by combining the respective in-plane retardations of the mutually adjacent biaxial retardation plates has a value of an in-plane retardation which is substantially ¼ of a wavelength of transmitted light.

21. The liquid crystal display device according to claim 20, wherein:

the pair of polarizing plates have their optical axes perpendicular to each other, the first and second biaxial retardation plates, each of which is provided on the respective exterior surfaces of the pair of substrate, are arranged so that their in-plane phase delaying axes in directions along which a refractive index is maximum in a plane parallel to the main surface of each of the substrates become perpendicular to each other, and the first and second biaxial retardation plates are arranged in such directions as to cross transmission axes of the polarizing plates adjacent thereto in a range of 5° to 25° or 65° to 85°, and the first and second uniaxial retardation plates, which are provided on the exterior surfaces of the first and second biaxial retardation plates, respectively, are arranged in such a manner that their in-plane phase delaying axes in directions along which a refractive index is maximum in a plane parallel to the main surface of each of the substrates become perpendicular to each other.

* * * * *